United States Patent
Aso et al.

(10) Patent No.: US 10,451,072 B2
(45) Date of Patent: Oct. 22, 2019

(54) PUMP, REFRIGERATION CYCLE APPARATUS, AND METHOD FOR MANUFACTURING PUMP

(75) Inventors: Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 771 days.

(21) Appl. No.: 14/375,160

(22) PCT Filed: Jan. 31, 2012

(86) PCT No.: PCT/JP2012/000597
§ 371 (c)(1),
(2), (4) Date: Oct. 7, 2014

(87) PCT Pub. No.: WO2013/114432
PCT Pub. Date: Aug. 8, 2013

(65) Prior Publication Data
US 2015/0033787 A1    Feb. 5, 2015

(51) Int. Cl.
*F04D 13/02*    (2006.01)
*F04D 29/60*    (2006.01)
(Continued)

(52) U.S. Cl.
CPC ........... *F04D 13/026* (2013.01); *F04D 13/06* (2013.01); *F04D 13/064* (2013.01); *F04D 29/601* (2013.01); *F25B 1/005* (2013.01); *H02K 1/2733* (2013.01); *H02K 1/30* (2013.01); *H02K 5/08* (2013.01); *H02K 5/128* (2013.01); *H02K 11/215* (2016.01); *H02K 11/33* (2016.01); *H02K 15/03* (2013.01); *H02K 15/095* (2013.01); *H02K 15/12* (2013.01); *H02K 29/08* (2013.01); *H02K 2211/03* (2013.01); *Y10T 29/49012* (2015.01)

(58) Field of Classification Search
CPC ........ F04D 13/064; F04D 1/04; F04D 29/026; F04D 29/2227; F04D 29/628; F24D 11/0214; F25B 1/005; F25B 30/02; F25B 49/022; H02K 15/03; H02K 1/02; H02K 1/27; H02K 1/2733; H02K 29/08
See application file for complete search history.

(56) References Cited

U.S. PATENT DOCUMENTS

| 5,682,072 | A | * | 10/1997 | Takahashi | ............ | H02K 1/2733 |
| | | | | | | 310/156.46 |
| 2012/0042974 | A1 | * | 2/2012 | Jiang | ...................... | H02K 1/278 |
| | | | | | | 137/833 |
| 2013/0119812 | A1 | * | 5/2013 | Takizawa | ................ | H02K 1/276 |
| | | | | | | 310/156.53 |

FOREIGN PATENT DOCUMENTS

| JP | 9014174 A | 1/1997 |
| JP | 11-234930 A | 8/1999 |

(Continued)

OTHER PUBLICATIONS

English translation of JP 2011-188702.*
(Continued)

*Primary Examiner* — Dominick L Plakkoottam
(74) *Attorney, Agent, or Firm* — Posz Law Group, PLC

(57) ABSTRACT

In a pump, a resin magnet included in a rotor portion has a plurality of groove portions in an outer peripheral portion thereof, the groove portions extending in an axial direction.

13 Claims, 15 Drawing Sheets

(51) Int. Cl.
  *H02K 15/095* (2006.01)
  *H02K 15/03* (2006.01)
  *F25B 1/00* (2006.01)
  *F04D 13/06* (2006.01)
  *H02K 5/128* (2006.01)
  *H02K 1/27* (2006.01)
  *H02K 1/30* (2006.01)
  *H02K 5/08* (2006.01)
  *H02K 15/12* (2006.01)
  *H02K 29/08* (2006.01)
  *H02K 11/215* (2016.01)
  *H02K 11/33* (2016.01)

(56) References Cited

FOREIGN PATENT DOCUMENTS

| JP | 2003-037953 A | | 2/2003 |
|---|---|---|---|
| JP | 2005198447 A | | 7/2005 |
| JP | 2005-323452 A | | 11/2005 |
| JP | 2005323452 A | * | 11/2005 |
| JP | 2009-197729 A | | 9/2009 |
| JP | 4479337 B2 | | 3/2010 |
| JP | 2011-188701 A | | 9/2011 |
| JP | 2011188702 A | * | 9/2011 |

OTHER PUBLICATIONS

English translation of JP 2005-323452.*
JP Office Action dated Aug. 4, 2015 in corresponding application No. 2013-556010 (with English translation).
International Search Report of the International Searching Authority dated Apr. 24, 2012 for the corresponding international application No. PCT/JP2012/000597 (and English translation).
Extended European Search Report dated Dec. 2, 2015 in the corresponding EP application No. 12867705.1.

* cited by examiner

PUMP, REFRIGERATION CYCLE APPARATUS, AND METHOD FOR MANUFACTURING PUMP

CROSS REFERENCE TO RELATED APPLICATION

This application is a U.S. national stage application of PCT/JP2012/000597 filed on Jan. 31, 2012, the contents of which are incorporated herein by reference.

TECHNICAL FIELD

The present invention relates to a pump, a refrigeration cycle apparatus, such as an air-conditioning apparatus, a floor heating apparatus, or a hot-water supplying apparatus, and a method for manufacturing the pump.

BACKGROUND ART

Various inventions related to pumps have been proposed. An example of such an invention is "a brushless motor and a pump including the brushless motor, the brushless motor including a cylindrical magnet that is externally coated with resin and a Hall element that detects positions of magnetic poles of the magnet, and generating a rotating magnetic field by applying a current to coils in accordance with a signal from the Hall element that detects the positions of the magnetic poles of the magnet, wherein magnet projections are provided on a Hall-element-side end surface of the magnet" (see, for example, Patent Literature 1).

In this pump, since the magnet projections are provided, the distance between the magnet and the Hall element is reduced. As a result, the magnetic force applied to the Hall element is increased, and does not become insufficient even when the magnet is heated to a high temperature and demagnetized. Consequently, abnormal heating of components of a control unit can be prevented, and normal operation can be continued.

CITATION LIST

Patent Literature

Patent Literature 1: Japanese Unexamined Patent Application Publication No. 2005-323452 (Pages 3 and 4 and FIG. 1)

SUMMARY OF INVENTION

Technical Problem

In the pump described in Patent Literature 1, since an outer peripheral portion of the magnet is coated with resin to fix the magnet, the distance between a stator and the magnet is large and there is a possibility that the performance of the motor that drives the pump will be degraded.

The present invention has been made to solve the above-described problem, and an object of the present invention is to provide a pump, a refrigeration cycle apparatus, and a method for manufacturing the pump with which a magnet included in a rotor of an electric motor for the pump is securely held and a distance between a stator and a magnet in a radial direction is reduced to improve the performance of a motor that drives the pump.

Solution to Problem

A pump according to the present invention includes a molded stator including a board on which a magnetic-pole-position detection element is mounted; and a rotor including a rotor portion that is rotatably accommodated in a cup-shaped partition wall component, the rotor portion opposing the magnetic-pole-position detection element at one end and having an impeller attachment portion for attaching an impeller at other end. In the rotor portion, a magnet and a sleeve bearing disposed inside the magnet are integrally assembled together by using a thermoplastic resin at a same time, and the impeller attachment portion is formed of the thermoplastic resin. The magnet has a plurality of groove portions in an outer peripheral portion thereof, the groove portions extending in an axial direction.

In a refrigeration cycle apparatus according to the present invention, a refrigerant circuit and a water circuit are connected to each other with a refrigerant-water heat exchanger, and the pump is mounted in the water circuit.

A method for manufacturing a pump according to the present invention includes method for manufacturing a pump, the method comprising the steps of forming insulating portions on teeth of a stator core, manufacturing a stator by winding coils around the teeth on which the insulating portions are formed, and manufacturing a board on which an electronic component is mounted and to which a lead-wire guide part, which guides a lead wire, is attached; manufacturing a rotor portion by integrally assembling a magnet having groove portions, which have a substantially angular shape and are arranged radially in an outer peripheral portion of the magnet, and a sleeve bearing disposed inside the magnet together by using a thermoplastic resin, and manufacturing an impeller; attaching the board to the stator, manufacturing a rotor by attaching the impeller to the rotor portion, and manufacturing a cup-shaped partition wall component, a shaft, and a thrust bearing; soldering a terminal of the stator to the board, attaching the rotor to the cup-shaped partition wall component, forming a casing having a water inlet and an outlet, and manufacturing a pilot-hole component; manufacturing a molded stator by integrally molding the stator and the pilot-hole component together with a molding resin, assembling a pump unit by fixing the casing to the cup-shaped partition wall component, and manufacturing the pump unit having a plurality of screw holes in an outer peripheral portion of the pump unit; and attaching the pump unit to the molded stator, and assembling the pump unit and the molded stator together by fastening self-tapping screws through the screw holes in the pump unit.

Advantageous Effects of Invention

With the pump according to the present invention, in the integral molding process using the thermoplastic resin, the groove portions are embedded in the thermoplastic resin, and the magnet is held by the thermoplastic resin. In addition, portions other than the groove portions are exposed at the outer periphery of the rotor portion. Therefore, the distance between the stator and the magnet can be reduced, and the performance of the pump can be improved. In addition, with the pump according to the present invention, since the groove portions are embedded in the thermoplastic resin and the magnet is held by the thermoplastic resin, cracking of the magnet due to thermal shock or the like can be suppressed, and the quality of the pump can be improved.

The refrigeration cycle apparatus according to the present invention includes the above-described pump. Since the performance and quality of the pump is increased, the performance and quality of the refrigeration cycle apparatus can also be improved.

The method for manufacturing the pump according to the present invention includes the step of manufacturing the rotor portion by combining the magnet and the sleeve bearing with the thermoplastic resin. The magnet includes the groove portions, which have a substantially angular shape and which are arranged radially in the outer peripheral portion of the magnet, and the sleeve bearing is disposed inside the magnet. Accordingly, portions other than the groove portions are exposed at the outer periphery of the rotor portion. Therefore, the distance between the stator and the magnet can be reduced and the performance of the pump can be improved.

DESCRIPTION OF EMBODIMENT

Embodiment of the present invention will now be described with reference to the drawings.

Figure 1:
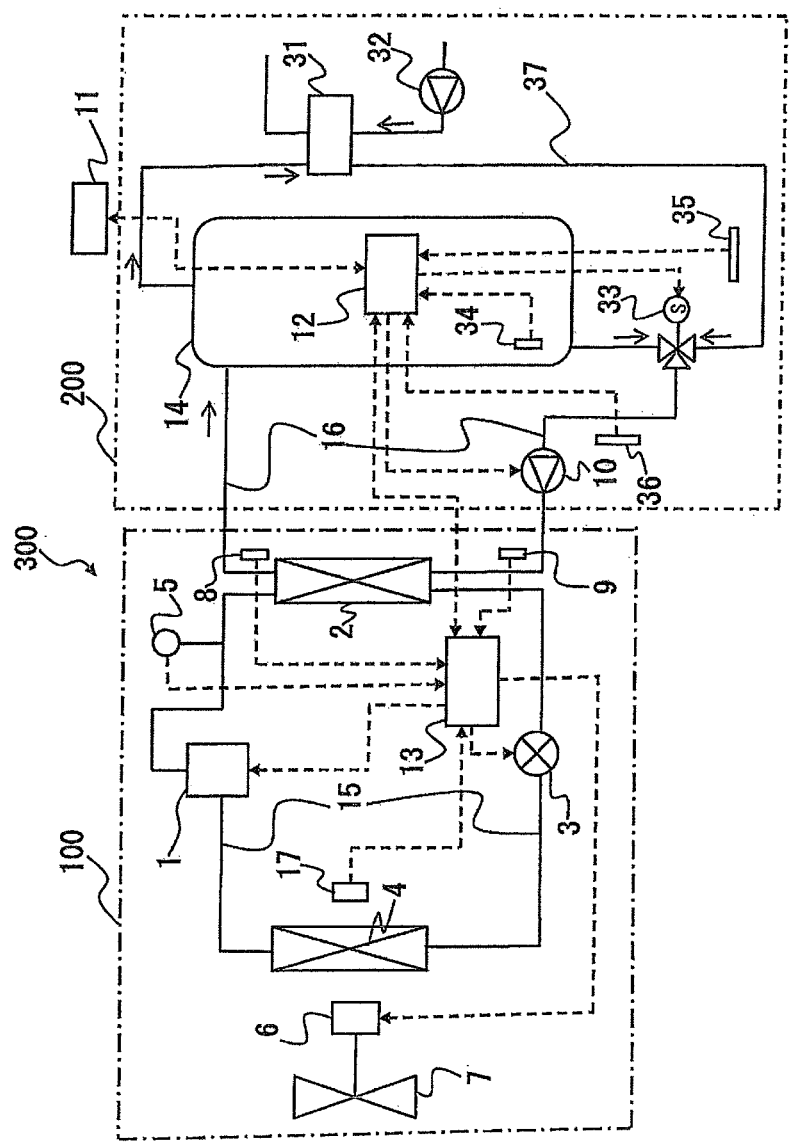
FIG. 1 is a schematic circuit diagram illustrating an example of a circuit configuration of a heat-pump-type hot-water supplying apparatus according to Embodiment of the present invention.

FIG. 1 is a schematic circuit diagram illustrating an example of a circuit configuration of a heat-pump-type hot-water supplying apparatus 300 (hereinafter referred to as a hot-water supplying apparatus 300) according to Embodiment of the present invention. The schematic structure of the hot-water supplying apparatus 300, which includes a pump according to Embodiment of the present invention, will be briefly described with reference to FIG. 1. In each of the figures, including FIG. 1, described below, the relationships between the sizes of the components may differ from those in practice.

The hot-water supplying apparatus 300 is an example of a refrigeration cycle apparatus including a refrigerant circuit, and includes a heat pump unit 100, a tank unit 200, and an operation unit 11 which is, for example, operated by a user.

Referring to FIG. 1, the heat pump unit 100 includes a compressor 1 (a rotary compressor, a scroll compressor, a vane compressor, etc.) that compresses refrigerant; a refrigerant-water heat exchanger 2 that exchanges heat between the refrigerant and water; a decompression device 3 that decompresses and expands high-pressure refrigerant; an evaporator 4 that evaporates low-pressure two-phase refrigerant; a pressure detection device 5 that detects a discharge pressure of the compressor 1; heating-temperature detection means 8 for the refrigerant-water heat exchanger 2; water-supply-temperature detection means 9 for the refrigerant-water heat exchanger 2; outside-air-temperature detection means 17; a fan 7 that blows air toward the evaporator 4; a fan motor 6 that drives the fan 7; and a heat-pump-unit controller 13.

The compressor 1, the refrigerant side of the refrigerant-water heat exchanger 2, the decompression device 3, and the evaporator 4 are connected in a loop with refrigerant pipes 15 to form a refrigerant circuit. The heat-pump-unit controller 13 receives signals from the pressure detection device 5, the heating-temperature detection means 8, the water-supply-temperature detection means 9, and the outside-air-temperature detection means 17, and performs rotation speed control of the compressor 1, opening degree control of the decompression device 3, and rotation speed control of the fan motor 6. The heat-pump-unit controller 13 also transmits/receives signals to/from a tank-unit controller 12.

The tank unit 200 includes a hot-water tank 14 that reserves hot water that has been heated as a result of heat exchange between high-temperature, high-pressure refrigerant and water in the refrigerant-water heat exchanger 2; a bath-water-reheating heat exchanger 31 that reheats bath water; a bath-water circulating device 32; a pump 10, which is a hot-water circulating device disposed between the refrigerant-water heat exchanger 2 and the hot-water tank 14; a mixing valve 33 connected to the pump 10, the hot-water tank 14, and the bath-water-reheating heat exchanger 31; a tank-water-temperature detection device 34; a reheated-water-temperature detection device 35 that detects the temperature of the water that has passed through the bath-water-reheating heat exchanger 31; a mixed-water-temperature detection device 36 that detects the temperature of the water that has passed through the mixing valve 33; and the tank-unit controller 12.

The hot-water tank 14, the mixing valve 33, the pump 10, and the water side of the refrigerant-water heat exchanger 2 are connected to each other with hot-water circulating pipes 16. Also, the hot-water tank 14, the bath-water-reheating heat exchanger 31, and the mixing valve 33 are connected to each other with bath-water reheating pipes 37. The tank-unit controller 12 receives signals from the tank-water-temperature detection device 34, the reheated-water-temperature detection device 35, and the mixed-water-temperature detection device 36, and performs rotation speed control of the pump 10 and opening and closing control of the mixing valve 33. The tank-unit controller 12 also transmits/receives signals to/from the operation unit 11. Although the tank-unit controller 12 is illustrated as if it is disposed inside the hot-water tank 14 in FIG. 1, the tank-unit controller 12 is disposed outside the hot-water tank 14 in practice.

The operation unit 11 is, for example, a remote control unit or an operation panel including switches or the like which allows the user to set the temperature of hot water or issue an instruction for discharging hot water.

A normal water heating operation of the hot-water supplying apparatus 300 having the above-described structure will now be described. When an instruction for a water heating operation is transmitted from the operation unit 11 or the tank unit 200 to the heat-pump-unit controller 13, the heat-pump-unit controller 13 executes the water heating operation by controlling each actuator (drive components including the compressor 1, the decompression device 3, and the fan motor 6).

More specifically, the heat-pump-unit controller 13, which is included in the heat pump unit 100, performs rotation speed control of the compressor 1, opening degree control of the decompression device 3, and rotation speed control of the fan motor 6 on the basis of, for example, detection values of the pressure detection device 5, the heating-temperature detection means 8, the water-supply-temperature detection means 9, and the outside-air-temperature detection means 17 and information from the operation unit 11 transmitted from the tank-unit controller 12.

In addition, the detection value obtained by the heating-temperature detection means 8 is transmitted between the heat-pump-unit controller 13 and the tank-unit controller 12, and the tank-unit controller 12 controls the rotation speed of the pump 10 so that the temperature detected by the heating-temperature detection means 8 approaches a target heating temperature.

In the hot-water supplying apparatus 300 that is controlled as described above, the high-temperature, high-pressure refrigerant discharged from the compressor 1 is supplied to the refrigerant-water heat exchanger 2, where the temperature of the refrigerant is reduced while heat is transferred to the water supply circuit. The high-pressure, low-temperature refrigerant that has transferred heat and passed through the refrigerant-water heat exchanger 2 is decompressed in the decompression device 3. The refrigerant that has passed through the decompression device 3 flows into the evaporator 4, where the refrigerant receives heat from the outside air. The low-pressure refrigerant that has flowed out of the evaporator 4 is sucked into the compressor 1, and is circulated. Thus, a refrigeration cycle is formed.

Water in a lower section of the hot-water tank 14 is guided to the refrigerant-water heat exchanger 2 by the operation of the pump 10, which is the hot-water circulating device. The water is heated by the heat transferred from the refrigerant-water heat exchanger 2. The heated hot water passes through the hot-water circulating pipes 16, and is returned to an upper section of the hot-water tank 14 so that the heat is accumulated.

As described above, in the hot-water supplying apparatus 300, the pump 10, which is the hot-water circulating device that circulates the hot water, is provided in the hot-water circulating pipe 16 between the hot-water tank 14 and the refrigerant-water heat exchanger 2.

Figure 2:
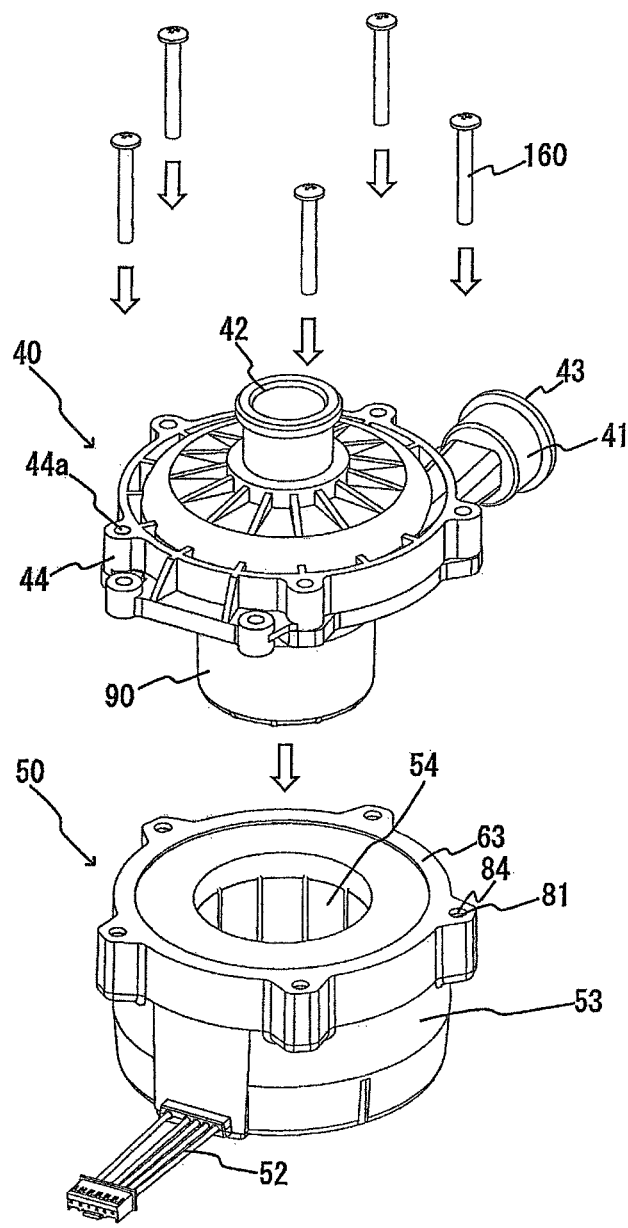
FIG. 2 is an exploded perspective view of a pump according to Embodiment of the present invention.

Next, the pump 10 according to Embodiment of the present invention, which is used as a hot-water circulating device, will be described. FIG. 2 is an exploded perspective view of the pump 10.

As illustrated in FIG. 2, the pump 10 includes a pump unit 40 that sucks in and discharges water by rotating a rotor (described below), a molded stator 50 having a mechanism that drives the rotor, and self-tapping screws 160 (five self-tapping screws are provided in the example of FIG. 2), which serve as fastening screws for fastening the pump unit 40 and the molded stator 50 together. The number of self-tapping screws 160 is not limited to five.

The pump 10 is assembled by inserting the five self-tapping screws 160 through screw holes 44a formed in boss portions 44 of the pump unit 40 and fastening the self-tapping screws 160 to pilot holes 84 formed in a pilot-hole component 81 (see FIG. 5 described below) embedded in the molded stator 50.

Figure 3:
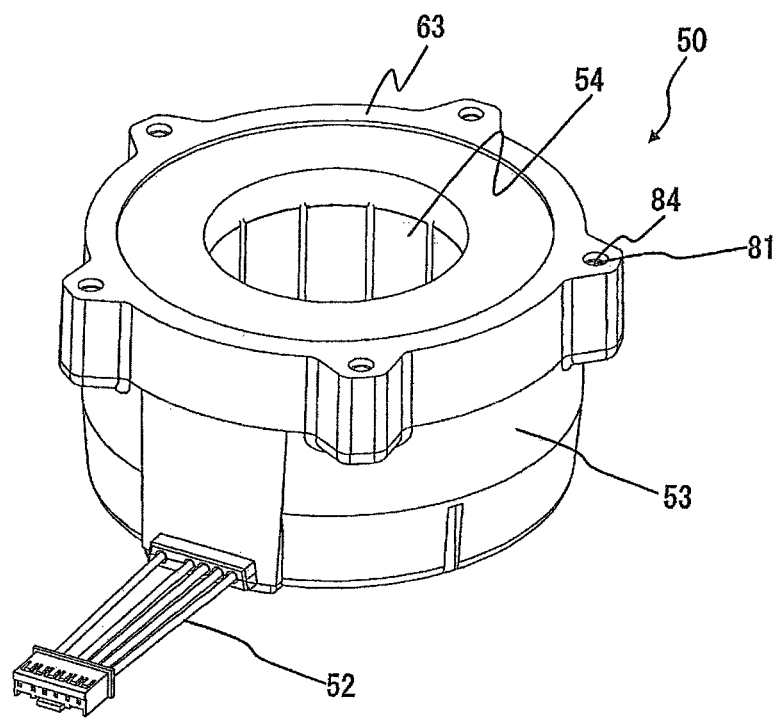
FIG. 3 is a perspective view of a molded stator of the pump according to Embodiment of the present invention.

First, the structure of the molded stator 50 will be described. FIG. 3 is a perspective view of the molded stator 50, FIG. 4 is a sectional view of the molded stator 50, and FIG. 5 is an exploded perspective view of a stator assembly 49.

Figure 4:
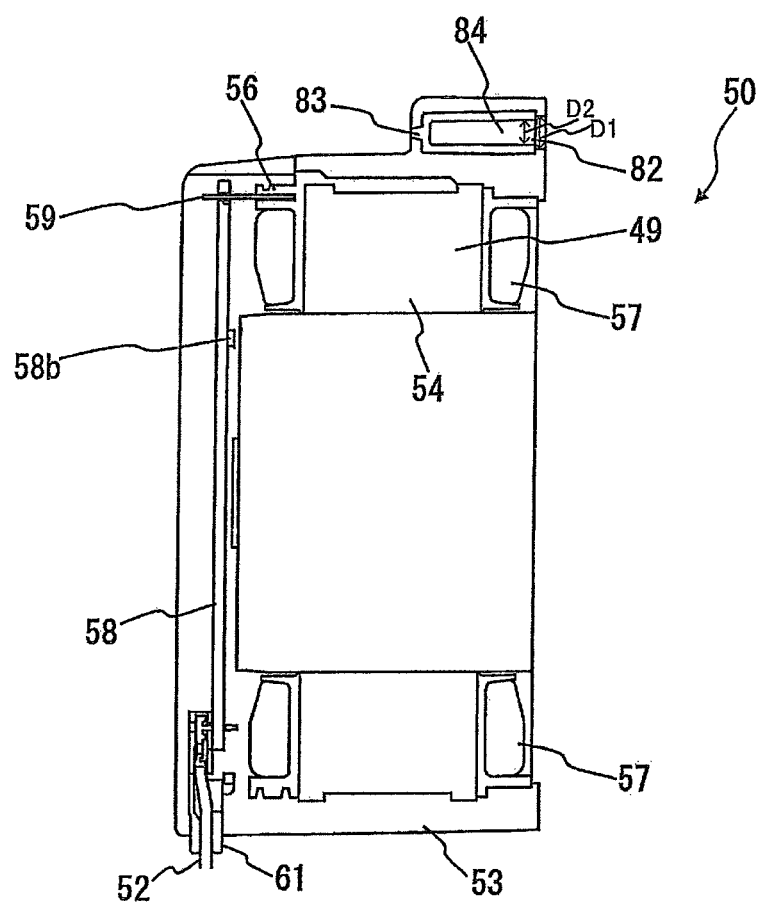
FIG. 4 is a sectional view of the molded stator of the pump according to Embodiment of the present invention.
Figure 5:
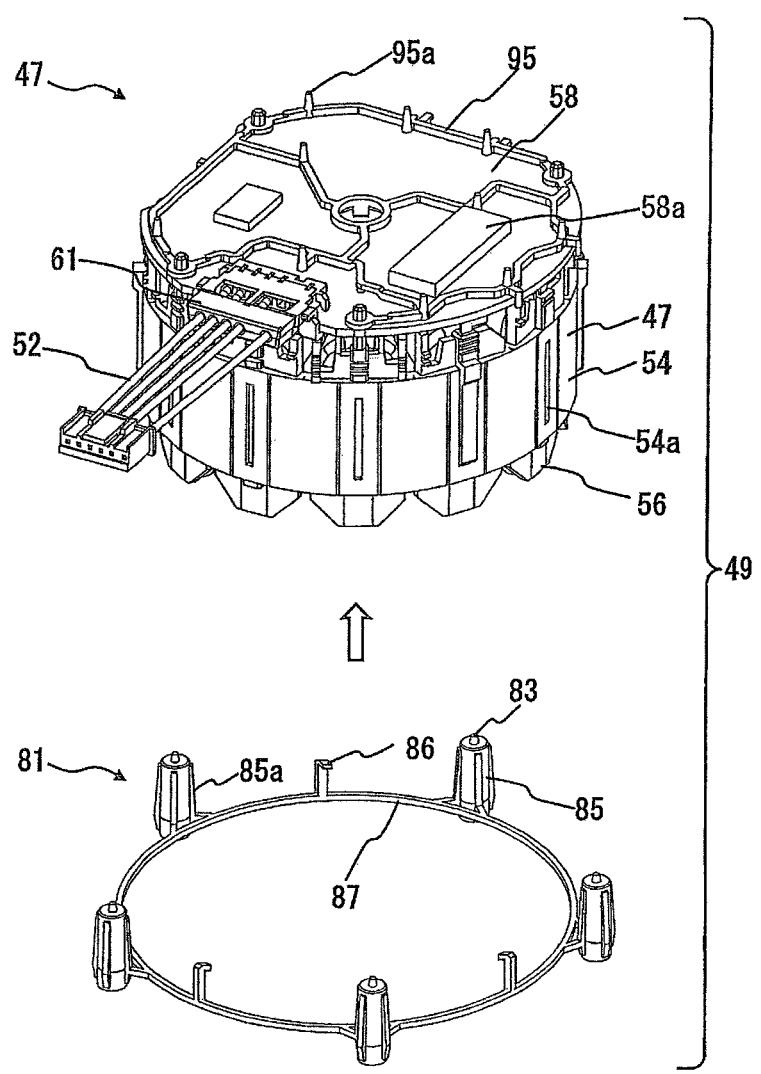
FIG. 5 is an exploded perspective view of a stator assembly of the pump according to Embodiment of the present invention.

As illustrated in FIGS. 3 and 4, the molded stator 50 is formed by molding the stator assembly 49 (see FIG. 5) with molding resin 53.

One end surface of the molded stator 50 in an axial direction (pump-unit-40-side end surface) is a flat pump-unit receiving surface 63 that extends along an outer peripheral edge portion.

Leg portions 85 (see FIGS. 4 and 5), which are substantially columnar resin molded parts, of the pilot-hole component 81 are embedded in the molding resin 53 so as to extend in the axial direction at five corners around the axis of the molding resin 53. In the state in which the pilot-hole component 81 is molded with resin, the pilot holes 84 open in the pump-unit receiving surface 63. In the molding process using the molding resin 53, one end surface (pump-unit-40-side end surface) of each leg portion 85 of the pilot-hole component 81 serves as a mold pressing portion 82 (see FIG. 4) for a mold. Therefore, the end surfaces of the pilot-hole component 81 embedded in the molding resin are partially exposed at a predetermined depth from the pump-unit receiving surface 63 in the axial direction. The mold pressing portions 82 and the pilot holes 84 for the self-tapping screws 160 are exposed.

A lead wire 52 extending from the stator assembly 49, which will be described below, extends to the outside from a position near the end surface of the molded stator 50 at the side opposite to the pump-unit-40 side in the axial direction (from the right corner in FIG. 4).

Positioning of the molded stator 50 in the axial direction in the molding process using the molding resin 53 (thermosetting resin) is achieved by causing outer end surfaces of a plurality of projections 95a on a board pressing member 95 (see FIG. 5) in the axial direction to serve as mold pressing portions for an upper mold part. Therefore, the outer end surfaces of the projections 95a in the axial direction (mold pressing surfaces) are exposed at the end surface of the molded stator 50 at a board-58 side in the axial direction.

In addition, end surfaces of insulating portions 56 at a side opposite to a connection side (at the pump-unit-40 side) in the axial direction serve as mold pressing portions for a lower mold part. Therefore, the end surfaces of the insulating portions 56 at the side opposite to the connection side are exposed at the end surface of the molded stator 50 at a side opposite to the board-58 side in the axial direction (not shown).

Positioning of the molded stator 50 in the radial direction in the molding process is achieved by fitting an inner peripheral surface of a stator core 54 to the mold. Therefore, end portions (inner peripheral portions) of teeth of the stator core 54 of the stator assembly 49 are exposed at the inner periphery of the molded stator 50, as illustrated in FIG. 3.

The inner structure of the molded stator 50, that is, the stator assembly 49 (the lead wire 52, the stator core 54, the insulating portions 56, coils 57, the board 58, terminals 59, etc., illustrated in FIG. 4) and the pilot-hole component 81, will be described below.

Next, the stator assembly 49 will be described. As illustrated in FIG. 5, the stator assembly 49 includes a stator 47 and the pilot-hole component 81.

The stator assembly 49 is manufactured by the following procedure.

(1) Strip-shaped electromagnetic steel sheets are punched out of an electromagnetic steel sheet having a thickness of about 0.1 to 0.7 mm, and are stacked together by caulking, welding, bonding, etc., to form the strip-shaped stator core 54. The strip-shaped stator core 54 includes a plurality of teeth. The end portions of the teeth of the stator core 54 are exposed at the inner periphery of the molded stator 50 illustrated in FIG. 3. The stator core 54 includes twelve teeth that are connected to each other with thin connecting portions. Therefore, in FIG. 3, the end portions of the teeth of the stator core 54 are exposed at twelve positions. However, only five of the twelve teeth are visible in FIG. 3.

(2) The insulating portions 56 are formed on the teeth of the stator core 54. The insulating portions 56 are formed integrally with or separately from the stator core 54 by using a thermoplastic resin, such as polybutylene terephthalate (PBT).

(3) The coils 57 (see FIG. 4), which are concentrated winding coils, are wound around the teeth on which the insulating portions 56 are formed. Twelve concentrated winding coils 57 are connected to form three-phase, single Y-connected windings.

(4) Since the three-phase, single Y-connected windings are formed, the terminals 59 (see FIG. 4, power supply terminals to which power is supplied and a neutral terminal), to which the coils 57 of each phase (U-phase, V-phase, and W-phase) are connected, are provided at the connection side of the insulating portions 56. Three power supply terminals and a single neutral terminal are provided.

(5) The board 58 is attached to the insulating portions 56 at the connection side (side at which the terminals 59 are attached). The board 58 is clamped between the board pressing member 95 and the insulating portions 56. An IC 58a (drive element) that drives an electric motor (brushless DC motor), a Hall element 58b (see FIG. 4, position detection element) that detects the position of a rotor 60, etc., are mounted on the board 58. Although the IC 58a is visible in FIG. 5 because it is mounted on the board 58 at the board-pressing-member-95 side, the Hall element 58b is not visible in FIG. 5 because it is mounted at the side opposite to the side at which the IC 58a is mounted. The IC 58a and the Hall element 58b are defined as electronic components. A lead-wire guide part 61, which guides the lead wire 52 to the outside, is attached to a cut portion of the board 58 at a position near the outer peripheral edge of the board 58.

(6) The board 58 to which the lead-wire guide part 61 is attached is fixed to the insulating portions 56 with the board pressing member 95, and the terminals 59 are soldered onto the board 58, so that the stator 47 is formed. The stator assembly 49 is completed by assembling the pilot-hole component 81 to the stator 47.

The structure of the pilot-hole component 81 will now be described with reference to FIG. 5. The pilot-hole component 81 is molded from a thermoplastic resin, such as polybutylene terephthalate (PBT).

As illustrated in FIG. 5, the pilot-hole component 81 includes the plurality of substantially columnar leg portions 85 that are connected to each other with a thin connecting portion 87. The leg portions 85 have the pilot holes 84 to which the self-tapping screws 160 are fastened, and projections 83 to which a mold contacts in the molding process. To prevent the pilot-hole component 81 from being extracted after being molded together with the stator 47, the substantially columnar leg portions 85 are counter-tapered such that the thickness thereof increases from the exposed end surfaces (the mold pressing portions 82 and end portions of the projections 83) toward the central regions of the leg portions 85.

In addition, the pilot-hole component 81 has a plurality of projections 85a for preventing rotation of the pilot-hole component 81 on the outer periphery of each leg portion 85 (for example, four projections 85a are provided on each leg portion 85). The projections 85a have a certain width in the circumferential direction and extends in the height direction of the leg portions 85. The projections 85a project from the outer peripheries of the leg portions 85 in the radial direction by an amount required to prevent rotation of the pilot-hole component 81. The substantially columnar leg portions 85 of the pilot-hole component 81 are connected to each other with the thin connecting portion 87, and therefore can be set to a mold at the same time. Thus, the processing cost can be reduced.

A plurality of lugs 86 for attaching the pilot-hole component 81 to the stator 47 are provided on the connecting portion 87 of the pilot-hole component 81, and the lugs 86 of the pilot-hole component 81 are engaged with grooves 54a formed in an outer peripheral portion of the stator core 54 of the stator 47. Accordingly, the stator 47 and the pilot-hole component 81 can be set to the mold at the same time, and the processing cost can be further reduced.

When the stator assembly 49, in which the pilot-hole component 81 is engaged with the stator 47, is molded with the molding resin 53, the end surfaces of the pilot-hole component 81 at the side at which the pilot holes 84 for the self-tapping screws 160 open (mold pressing portions 82) and the projections 83 provided on the end surfaces of the pilot-hole component 81 at the other side are clamped by the mold, so that the pilot-hole component 81 is positioned in the axial direction.

The diameter D2 of the mold pressing portions 82 on the end surfaces of the pilot-hole component 81 at the side at which the pilot holes 84 for the self-tapping screws 160 open is set so as to be smaller than the diameter D1 of the end surfaces of the pilot-hole component 81 at the opening side (see FIG. 4). Accordingly, the end surfaces of the pilot-hole component 81 are covered by the molding resin 53 in regions excluding the mold pressing portions 82. Consequently, the end surfaces of the pilot-hole component 81 at both sides thereof are covered by the molding resin 53, so that the area in which the pilot-hole component 81 is exposed can be reduced and the quality of the pump 10 can be improved.

The molded stator 50 is formed by molding the stator 47 and the pilot-hole component 81 attached thereto together with the molding resin 53, and the pilot holes 84 for the self-tapping screws 160 in the leg portions 85 of the pilot-hole component 81 are exposed in this state. The pump unit 40 and the molded stator 50 are assembled together by inserting the self-tapping screws 160 through the screw holes 44a formed in the pump unit 40 and fastening the self-tapping screws 160 to the pilot holes 84. In this way, the pump unit 40 and the molded stator 50 can be securely assembled together (see FIG. 2).

Figure 6:
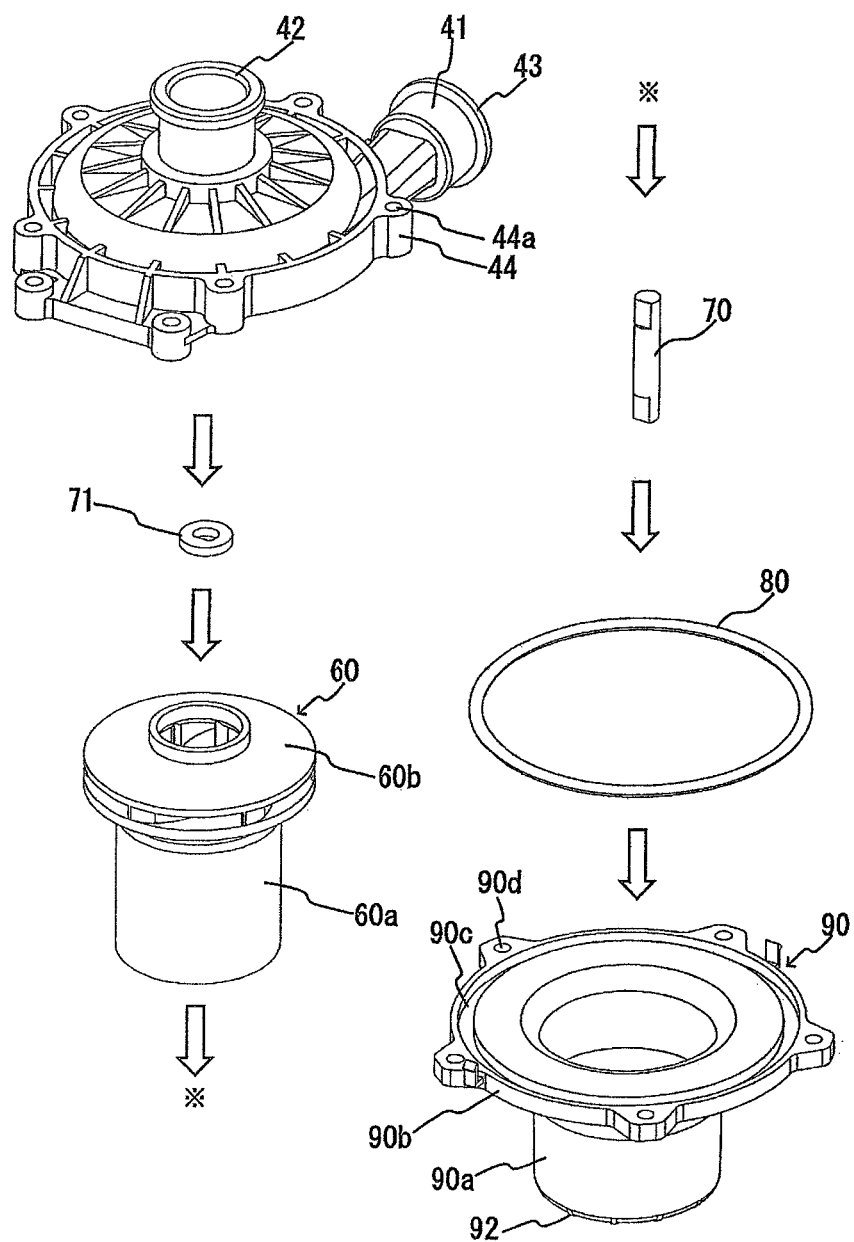
FIG. 6 is an exploded perspective view of a pump unit of the pump according to Embodiment of the present invention.
Figure 7:
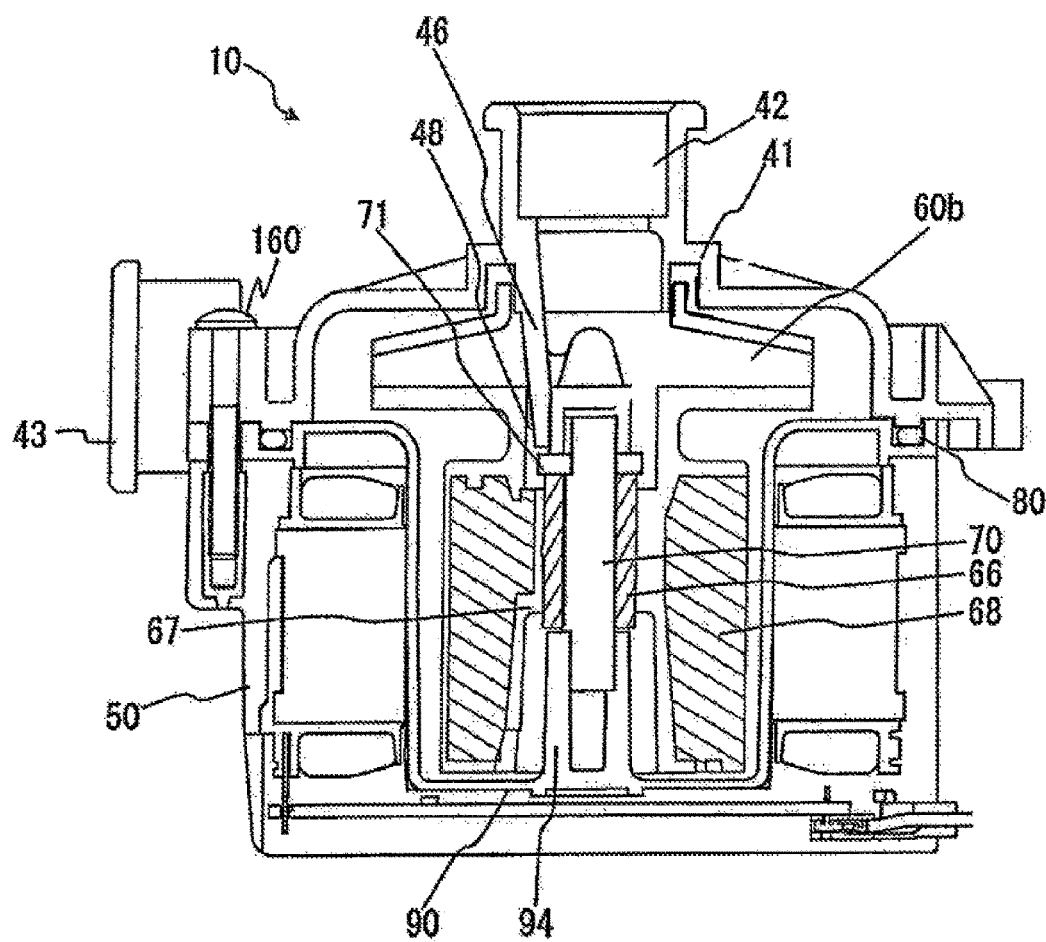
FIG. 7 is a sectional view of the pump according to Embodiment of the present invention.
Figure 8:
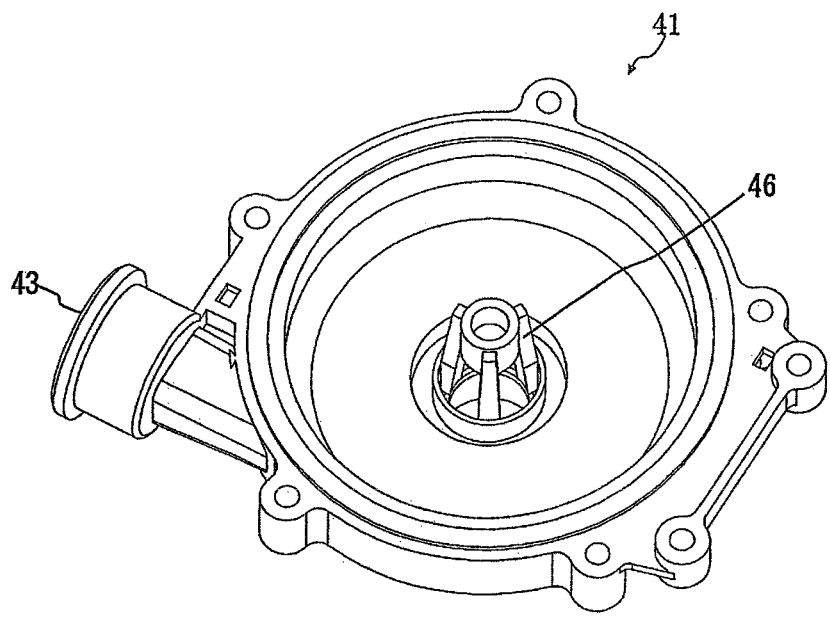
FIG. 8 is a perspective view of a casing of the pump according to Embodiment of the present invention viewed from a shaft-support-portion side.

The structure of the pump unit 40 will now be described. FIG. 6 is an exploded perspective view of the pump unit 40, FIG. 7 is a sectional view of the pump 10, and FIG. 8 is a perspective view of a casing 41 viewed from a shaft-support-portion-46 side.

As illustrated in FIG. 6, the pump unit 40 includes the following components.

(1) Casing 41

The casing 41 has a fluid inlet 42 and a fluid outlet 43, and contains an impeller 60b of the rotor 60 therein. The casing 41 is molded from a thermoplastic resin, such as polyphenylene sulfide (PPS). The casing 41 includes five boss portions 44 on an end portion thereof at the fluid-inlet-42 side, the boss portions 44 having the screw holes 44a used to assemble the pump unit 40 and the molded stator 50 together.

(2) Thrust Bearing 71

A thrust bearing 71 is formed of a ceramic, such as alumina. During the operation of the pump 10, the rotor 60 is pressed against the casing 41 with the thrust bearing 71 interposed therebetween owing to a difference between pressures applied to front and back sides of the impeller 60b of the rotor 60. Therefore, the thrust bearing 71 is formed of a ceramic to ensure sufficient wear resistance and sliding performance.

(3) Rotor 60

The rotor 60 includes a rotor portion 60a and the impeller 60b. The rotor portion 60a includes a ring-shaped (cylindrical) resin magnet 68 (example of a magnet) molded from pellets formed by kneading powder of a magnetic material, such as ferrite, and resin, and a cylindrical sleeve bearing 66 (formed of, for example, carbon) disposed inside the resin magnet 68. The resin magnet 68 and the sleeve bearing 66 are integrated together with a resin portion 67 formed of, for example, polyphenylene ether (PPE) (see FIG. 11). The impeller 60b is molded from a resin, such as polyphenylene ether (PPE). The rotor portion 60a and the impeller 60b are bonded together by, for example, ultrasonic welding. The rotor portion 60a of the rotor 60 will be described in detail below.

(4) Shaft 70

A shaft 70 is formed of, for example, a ceramic, such as alumina, or SUS. Since the shaft 70 slides with respect to the sleeve bearing 66 of the rotor 60, a material such as a ceramic or SUS is selected to ensure sufficient wear resistance and sliding performance. One end of the shaft 70 is inserted into a shaft support portion 94 of the cup-shaped partition wall component 90, and the other end of the shaft 70 is inserted into a shaft support portion 46 of the casing 41. The one end of the shaft 70 is inserted into the shaft support portion 94 of the cup-shaped partition wall component 90 so that the shaft 70 does not rotate relative to the shaft support portion 94. For this purpose, the one end of the shaft 70 is formed in a D-shape by partially cutting a circular shape thereof over a certain length (in the axial direction), and the shaft support portion 94 of the cup-shaped partition wall component 90 has a hole having a shape corresponding to the shape of the shaft. The other end of the shaft 70 that is inserted into the shaft support portion 46 of the casing 41 is also formed in a D-shape by partially cutting a circular shape thereof over a certain length (in the axial direction). Thus, the shaft 70 is symmetric about the center thereof in the longitudinal direction. The other end of the shaft 70 is rotatably inserted into the shaft support portion 46 of the casing 41. The shaft 70 is formed so as to be symmetric about the center thereof in the longitudinal direction so that it is possible to insert the shaft 70 into the shaft support portion 94 of the cup-shaped partition wall component 90 without controlling the orientation of the shaft 70 in the vertical direction (see FIG. 6).

(5) O-Ring 80

An O-ring 80 is formed of, for example, ethylene-propylene-diene rubber (EPDM). Ethylene-propylene-diene rubber is obtained by introducing a small amount of third component into ethylene-propylene rubber (EPM), which is a copolymer of ethylene and propylene, to form a double bond in the main chain. Various types of synthetic rubbers having different types and amounts of third component are commercially available. Typical examples of the third component include ethylidene norbornene (ENB), 1,4-hexadiene (1,4-HD), and dicyclopentadiene (DCP). The O-ring 80 is clamped between the casing 41 of the pump unit 40 and the cup-shaped partition wall component 90, and seals a gap between the casing 41 of the pump unit 40 and the cup-shaped partition wall component 90. In the pump 10 installed in a hot-water supplying apparatus or the like, seals used in wet areas are required to have a high heat resistance and long life. Therefore, a material such as EPDM is used to ensure sufficient heat resistance.

(6) Cup-Shaped Partition Wall Component 90

The cup-shaped partition wall component 90 is formed of a thermoplastic resin, such as polyphenylene ether (PPE). The cup-shaped partition wall component 90 includes the cup-shaped partition wall portion 90a, which is fitted to the molded stator 50, and a flange portion 90b. The cup-shaped partition wall portion 90a includes a circular bottom portion and a cylindrical partition wall. The shaft support portion 94, into which the one end of the shaft 70 is inserted, stands on the inner surface of the circular bottom portion in a substantially central region thereof. A plurality of reinforcing ribs (not shown) (for example, ten reinforcing ribs) for reinforcing the flange portion 90b are formed on the flange portion 90b so as to extend in the radial direction. In addition, an annular rib (not shown) to be fitted to the pump-unit receiving surface 63 of the molded stator 50, the pump-unit receiving surface 63 receiving the pump unit 40, is also formed on the flange portion 90b. The flange portion 90b has five holes 90d through which the self-tapping screws 160 are inserted. The flange portion 90b also has an annular O-ring receiving groove 90c for receiving the O-ring 80 in a casing-41-side surface thereof.

The pump 10 is assembled by placing the O-ring 80 on the cup-shaped partition wall component 90, assembling the pump unit 40 by attaching the casing 41 to the cup-shaped partition wall component 90, and fixing the pump unit 40 to the molded stator 50 with the self-tapping screws 160 or the like.

Ribs 92 provided on the bottom portion of the cup-shaped partition wall component 90 are fitted to grooves (not shown) formed in the molded stator 50, so that the pump unit 40 and the molded stator 50 are positioned relative to each other in the circumferential direction.

The rotor 60 is disposed inside the inner periphery of the cup-shaped partition wall portion 90a of the cup-shaped partition wall component 90 such that the rotor 60 is fitted to the shaft 70 that is inserted in the shaft support portion 94 of the cup-shaped partition wall component 90. To allow the molded stator 50 and the rotor 60 to be arranged coaxially, a gap between the inner periphery of the molded stator 50 and the outer periphery of the cup-shaped partition wall portion 90a of the cup-shaped partition wall component 90 are preferably as small as possible. The gap is set to, for example, about 0.02 to 0.06 mm.

If the gap between the inner periphery of the molded stator 50 and the outer periphery of the cup-shaped partition wall portion 90a of the cup-shaped partition wall component 90 is reduced, the space for allowing air to escape when the cup-shaped partition wall portion 90a of the cup-shaped partition wall component 90 is inserted into the space inside the inner periphery of the molded stator 50 is reduced. As a result, it becomes difficult to insert the cup-shaped partition wall component 90. To avoid this, a groove (not shown) for allowing air to escape that extends in the axial direction may be formed in an inner peripheral portion of the molded stator 50. In the case where the groove is not formed, the gap may be formed so as to be larger than 0.02 to 0.06 mm.

Figure 9:
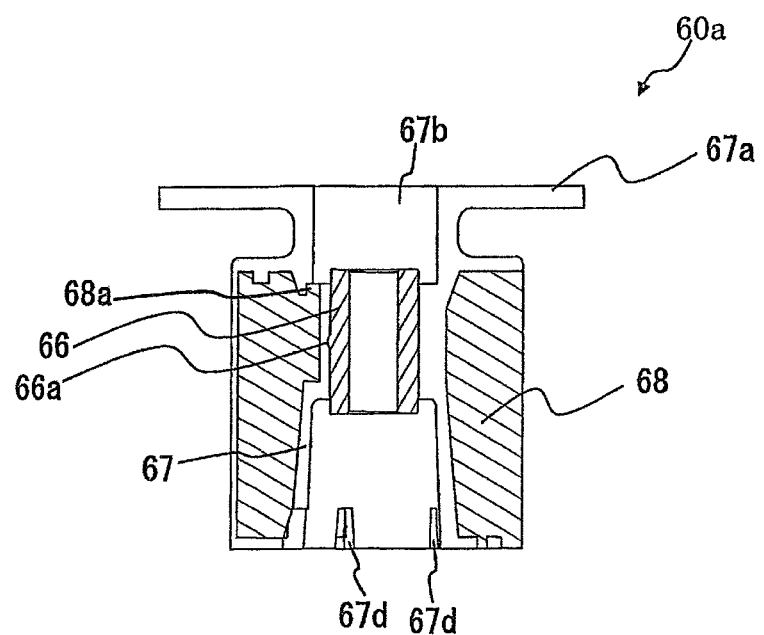
FIG. 9 is a sectional view of a rotor portion of the pump according to Embodiment of the present invention.
Figure 10:
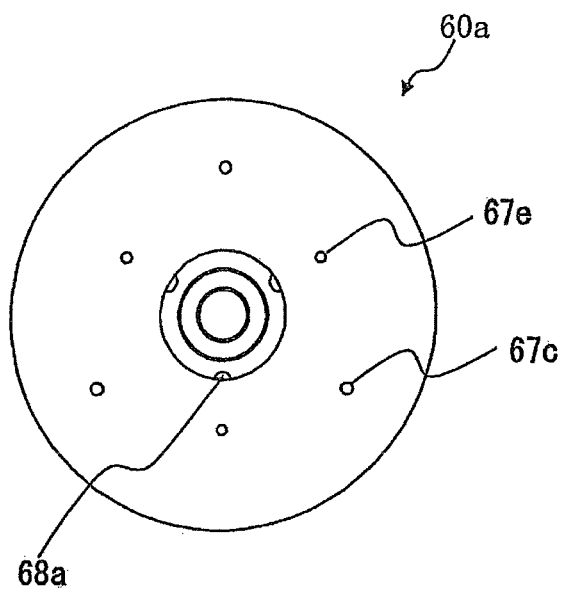
FIG. 10 is a side view of the rotor portion of the pump according to Embodiment of the present invention viewed from an impeller-attachment-portion side.
Figure 11:
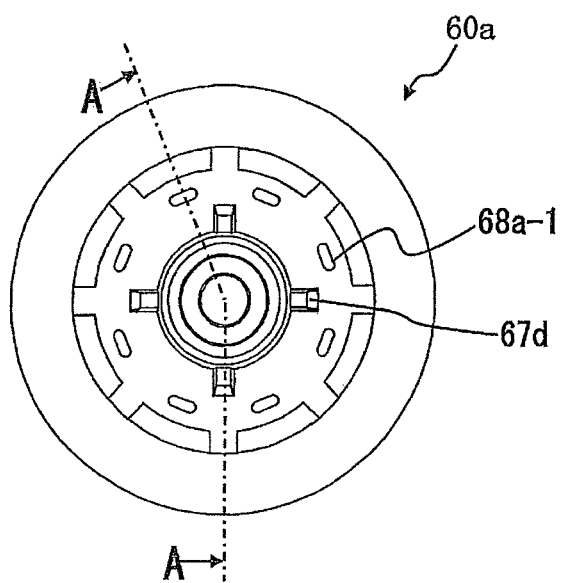
FIG. 11 is a side view of the rotor portion of the pump according to Embodiment of the present invention viewed from a side opposite to the impeller-attachment-portion side.
Figure 12:
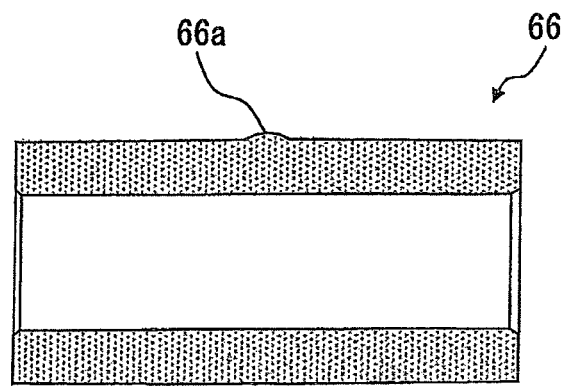
FIG. 12 is an enlarged sectional view of a sleeve bearing of the pump according to Embodiment of the present invention.

FIG. 9 is a sectional view of the rotor portion 60a (sectional view of FIG. 11 taken along line A-A), FIG. 10 is a side view of the rotor portion 60a viewed from an impeller-attachment-portion-67a side, FIG. 11 is a side view of the rotor portion 60a viewed from a side opposite to the impeller-attachment-portion-67a side, and FIG. 12 is an enlarged sectional view of the sleeve bearing 66. The rotor portion 60a will now be described with reference to FIGS. 9 to 12.

As illustrated in FIGS. 9 to 11, the rotor portion 60a includes at least the following elements. The resin magnet 68 and the sleeve bearing 66 are molded together with a thermoplastic resin (resin portion 67) such as polyphenylene ether (PPE).

(1) Resin Magnet 68

The resin magnet 68 is substantially ring-shaped (cylindrical), and is molded from pellets formed by kneading powder of a magnetic material, such as ferrite, and resin.

(2) Sleeve Bearing 66

The sleeve bearing 66 (formed of, for example, carbon) is disposed inside the resin magnet 68. The sleeve bearing 66 has a cylindrical shape. The sleeve bearing 66 is rotated while being fitted to the shaft 70, which is attached to the cup-shaped partition wall component 90 of the pump 10. Therefore, the sleeve bearing 66 is formed of a material suitable for a bearing, such as a sintered carbon, a thermoplastic resin, such as polyphenylene sulfide (PPS), to which carbon fibers are added, or a ceramic. The sleeve bearing 66 is tapered such that the outer diameter thereof decreases from a region around the axial center toward both ends thereof, and is provided with a plurality of semi-spherical projections 66a (see FIG. 12) on the outer periphery thereof in the region around the axial center, the projections 66a serving as rotation stoppers.

(3) Resin Portion 67 (Portion Formed of Thermoplastic Resin; Impeller Attachment Portion 67a to which the Impeller 60b is Attached is Formed Together with the Resin Portion 67 Made of the Thermoplastic Resin)

A portion of the resin portion 67, the portion being formed on an impeller-attachment-portion-67a-side end surface of the resin magnet 68, has a first recess 67b at a position corresponding to a magnet pressing portion provided on an upper part of a mold used in resin molding. In the example illustrated in FIG. 9, the first recess 67b is formed substantially in a central region (in the radial direction). The first recess 67b is located so as to oppose projections 68a of the resin magnet 68.

As illustrated in FIG. 10, impeller positioning holes 67c used to attach the impeller 60b are formed in an impeller attachment portion 67a with substantially constant intervals therebetween in the circumferential direction. The number of impeller positioning holes 67c is, for example, three. The impeller positioning holes 67c extend through the impeller attachment portion 67a. Each of the impeller positioning holes 67c is formed on a radial line that extends through the middle position between two of the three projections 68a of the resin magnet 68 (three projections 68a are illustrated in FIG. 10).

In addition, as illustrated in FIG. 10, gates 67e (resin injection ports) used when the rotor portion 60a is molded with the thermoplastic resin (resin portion 67) are formed on the impeller attachment portion 67a with substantially constant intervals therebetween in the circumferential direction. The number of gates 67e is, for example, three. The gates 67e are formed on radial lines that pass through three projections 68a of the resin magnet 68, and are located further toward the inside than the impeller positioning holes 67c.

Cuts 67d, which are fitted to positioning projections (not shown) provided on a lower part of the mold used in resin molding, are formed in a portion of the resin portion 67, the portion formed on an inner peripheral surface of the resin magnet 68 at a side opposite to the impeller-attachment-portion-67a side (see FIGS. 9 and 11). In the example illustrated in FIG. 11, the cuts 67d are formed at four positions that are apart from each other by approximately 90 degrees. The positions of the cuts 67d correspond to the positions of cuts 68b in the resin magnet 68 (FIG. 15 described below).

Figure 13:
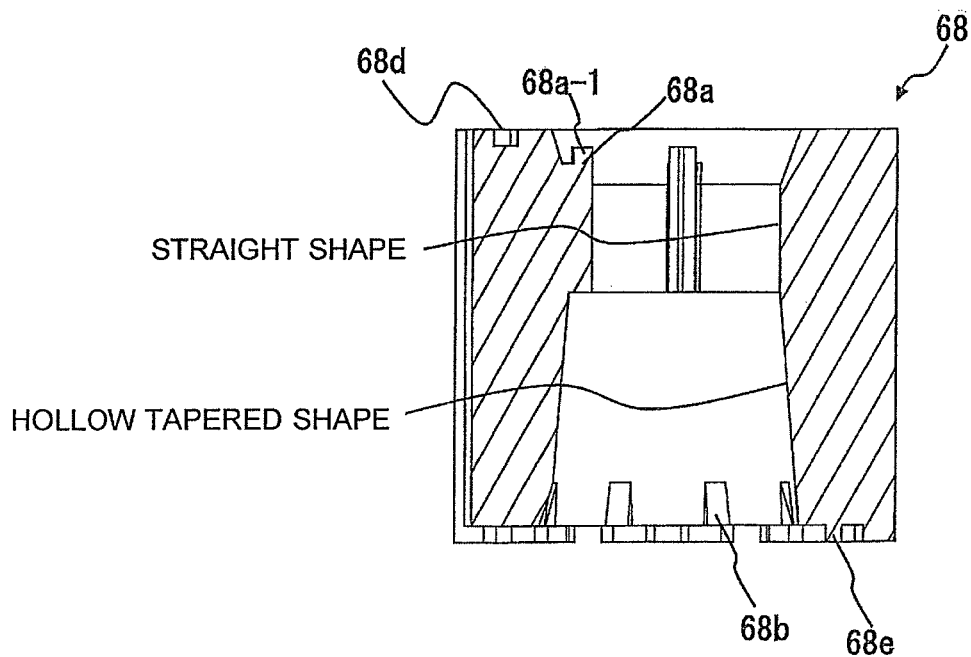
FIG. 13 is a sectional view of a resin magnet of the pump according to Embodiment of the present invention.
Figure 14:
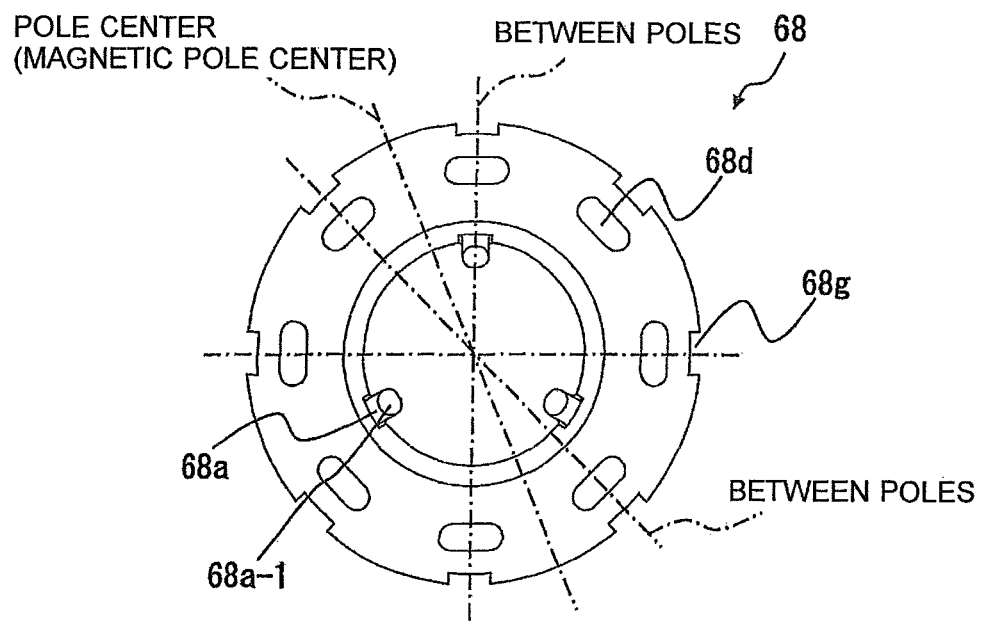
FIG. 14 is a side view of the resin magnet of the pump according to Embodiment of the present invention viewed from a projection side.
Figure 15:
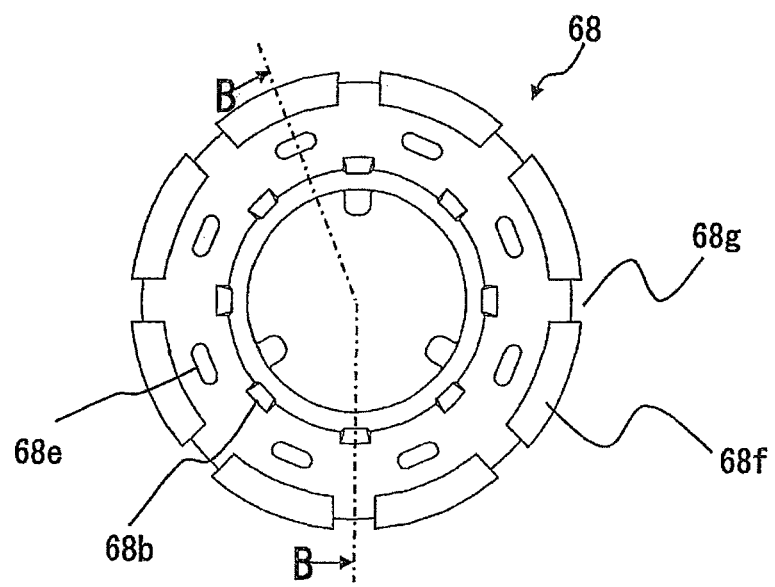
FIG. 15 is a side view of the resin magnet of the pump according to Embodiment of the present invention viewed from a side opposite to the projection side.
Figure 16:
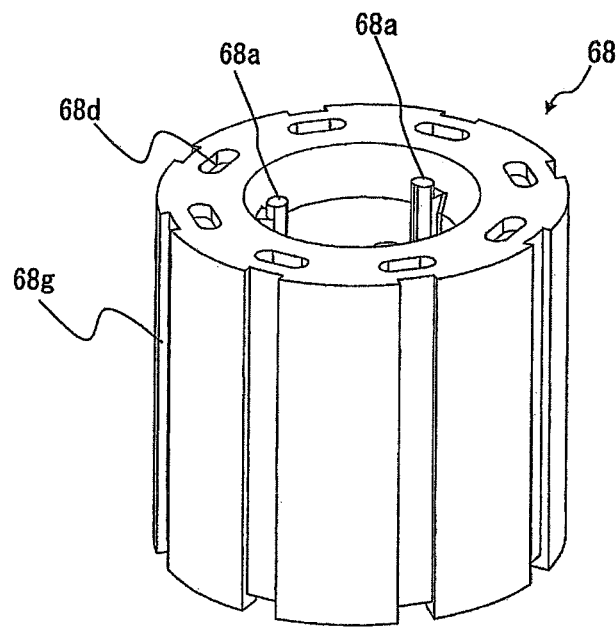
FIG. 16 is a perspective view of the resin magnet of the pump according to Embodiment of the present invention viewed from the projection side.
Figure 17:
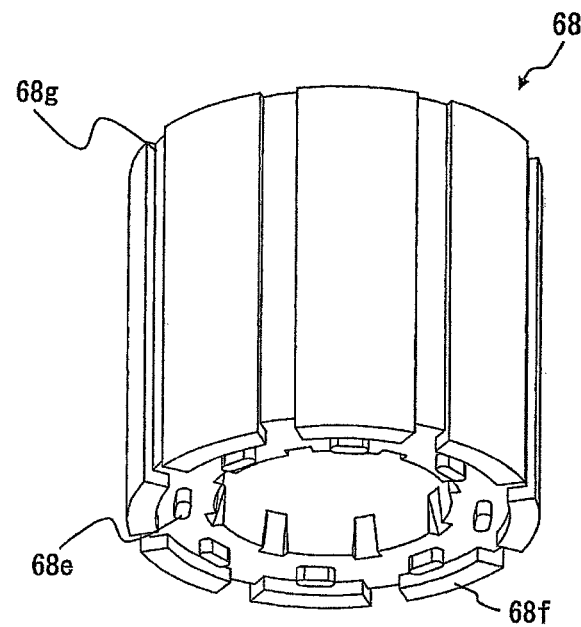
FIG. 17 is a perspective view of the resin magnet of the pump according to Embodiment of the present invention viewed from the side opposite to the projection side.
Figure 18:
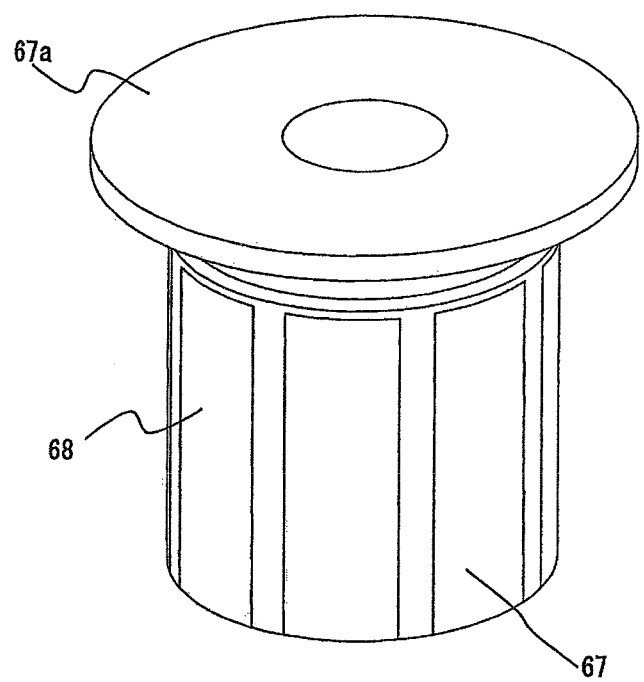
FIG. 18 is a perspective view of the rotor portion of the pump according to Embodiment of the present invention viewed from the projection side.
Figure 19:
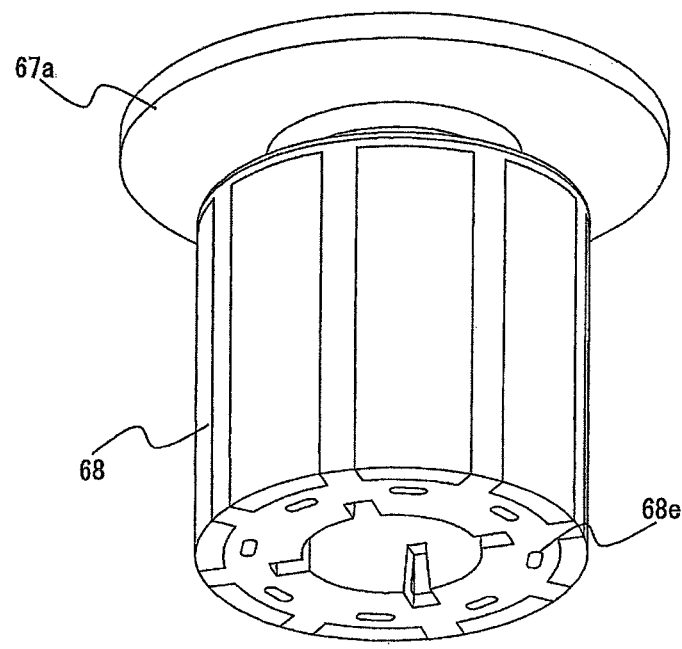
FIG. 19 is a perspective view of the resin magnet of the pump according to Embodiment of the present invention viewed from the side opposite to the projection side.

FIG. 13 is a sectional view of the resin magnet 68 (sectional view of FIG. 15 taken along line B-B), FIG. 14 is a side view of the resin magnet 68 viewed from a projection-68a side, FIG. 15 is a side view of the resin magnet 68 viewed from a side opposite to the projection-68a side, FIG. 16 is a perspective view of the resin magnet 68 viewed from the projection-68a side, FIG. 17 is a perspective view of the resin magnet 68 viewed from the side opposite to the projection-68a side, FIG. 18 is a perspective view of the rotor portion 60a viewed from the projection-68a side, FIG. 19 is a perspective view of the resin magnet 68 viewed from the side opposite to the projection-68a side. The structure of the resin magnet 68 will now be described in detail with reference to FIGS. 13 to 19.

The resin magnet 68 described herein includes eight magnetic poles. In the state in which the resin magnet 68 is integrated in the rotor 60, the plurality of cuts 68b, which are tapered, are formed in an inner peripheral region of the end surface of the resin magnet 68 at the side opposite to the impeller-attachment-portion-67a side. The tapered cuts 68b are arranged in the circumferential direction with substantially constant intervals therebetween. In the example illustrated in FIG. 15, eight cuts 68b are formed. The cuts 68b are counter-tapered such that the diameter thereof increases from an inner region in the axial direction toward the end surface.

The plurality of projections 68a, which have a substantially angular shape (arc shape), are formed in an inner peripheral region of the resin magnet 68 at a certain depth from the end surface that opposes the end surface in which the tapered cuts 68b are formed. The projections 68a are arranged in the circumferential direction with substantially constant intervals therebetween. In the example illustrated in FIG. 14, the number of projections 68a is three.

As illustrated in FIG. 14, the projections 68a have a substantially angular shape in side view and have protruding portions 68a-1 at the end-surface side. When the rotor portion 60a is integrally formed by the molding process, the protruding portions 68a-1 at the ends of the projections 68a are held by the thermoplastic resin (resin portion 67) of the rotor portion 60a. Thus, even when a small gap is formed between the resin portion 67 and the resin magnet 68 due to shrinkage of the resin, the rotational torque of the resin magnet 68 can be reliably transmitted. As a result, the quality of the rotor portion 60a can be improved. The shape of the projections 68a is not limited to the substantially angular shape, and may be, for example, a triangular shape, a trapezoidal shape, a semi-circular shape, or a polygonal shape.

The resin magnet 68 has gates (not shown) to which plastic magnet (material of the resin magnet 68) is supplied at a side at which the resin magnet 68 opposes a magnetic-pole-position detection element (Hall element 58b (see FIG. 4)) in the state in which the resin magnet 68 is molded in the rotor 60. The gates are located at pole centers (magnetic pole centers). Since the gates to which the resin magnet 68 is supplied are at the magnetic pole centers, the alignment accuracy of the resin magnet 68 can be increased.

As illustrated in FIG. 13, a hollow portion of the resin magnet 68 has a straight shape from the end surface at which the projections 68a are formed to a position around the center in the axial direction, and has a tapered shape from the end surface that opposes the end surface at which the projections 68a are formed to the position around the center in the axial direction. Therefore, the molded part can be easily removed from a mold. As a result, the productivity of the resin magnet 68 can be increased and the manufacturing cost can be reduced. That is, since the hollow portion of the resin magnet 68 is a hollow tapered shape, the risk that a part or the entirety of the molded part will adhere to the mold and cannot be removed from the mold (risk of adhesion to the mold) can be prevented and the productivity of the resin magnet 68 can be increased. The mold used to form the resin magnet 68 can be divided into a fixed mold part and an operated mold part at a position corresponding to the end surfaces of the projections 68a at the side at which the hollow portion is tapered, and a part of the hollow portion formed by the operated mold part has a straight shape. Accordingly, the adhesion to the fixed mold part can be more reliably prevented, and the productivity of the resin magnet 68 can be increased. Removal from the operated mold part is performed by using an ejector pin.

As illustrated in FIG. 15, a plurality of projecting portions 68e (eight projecting portions 68e in the example illustrated in FIG. 15) that are substantially elliptical in cross section are formed so as to be arranged radially on an end surface of the resin magnet 68, the end surface opposing the magnetic-pole-position detection element (Hall element 58b (see FIG. 4)). In addition, as illustrated in FIG. 14, a plurality of recesses 68d (eight recesses 68d in the example illustrated in FIG. 14) that are substantially elongated-hole-shaped in cross section are formed so as to be arranged radially in the impeller-attachment-portion-67a-side end surface of the resin magnet 68. In addition, a plurality of groove portions 68g that have a substantially angular shape are formed in an outer peripheral portion of the resin magnet 68. The groove portions 68g are arranged radially and extend in the axial direction from both end surfaces of the resin magnet 68 toward the axial center of the resin magnet 68. The groove portions 68g are formed so as to open in both end surfaces of the rotor 60.

When the rotor portion 60a is integrally formed by the molding process using the thermoplastic resin (resin portion 67), the projecting portions 68e, the recesses 68d, and the groove portions 68g are embedded in the thermoplastic resin (resin portion 67), and the resin magnet 68 is held by the resin portion 67 (see FIGS. 18 and 19).

The groove portions 68g have substantially the same shape and are arranged substantially radially. Also, the groove portions 68g are located between the magnetic poles formed in the rotor 60. Since the groove portions 68g are formed between the poles of the resin magnet 68, reduction in the magnetic force can be made as small as possible and degradation of the performance of the pump 10 can be suppressed. In addition, since the groove portions 68g extend to both end surfaces of the resin magnet 68, the resin magnet 68 can be more securely held.

As illustrated in FIG. 15, the projecting portions 68e, which are formed on the surface that opposes the magnetic-pole-position detection element (Hall element 58b (see FIG. 4)), are formed substantially at the centers of the magnetic poles formed in the rotor 60. In other words, the projecting portions 68e are formed so as to be arranged radially at the positions between the gates (not shown) to which the material of the resin magnet 68 is supplied.

Since the projecting portions 68e are provided at the pole centers, sufficient magnetic force can be ensured, and the accuracy of magnetic-pole-position detection performed by the Hall element 58b can be increased. Accordingly, the quality of the pump 10 can be improved. In addition, the magnetic force of the resin magnet 68 can be increased, so that the performance of the pump 10 can be improved.

The recesses 68d formed in the resin magnet 68 at the impeller-attachment-portion-67a side are located between the magnetic poles formed in the rotor 60, that is, on substantially the same radial lines as the gates to which the material of the resin magnet 68 is supplied. When the recesses 68d are provided between the poles of the resin magnet 68, reduction in the magnetic force can be made as small as possible, and degradation of performance of the pump 10 can be suppressed.

In the resin magnet 68, at least one of the number of projecting portions 68e formed on the surface that opposes the magnetic-pole-position detection element (Hall element 58b (see FIG. 4)) and the number of recesses 68d formed at the impeller-attachment-portion-67a side is the same as the number of magnetic poles formed in the rotor 60. When the numbers of projecting portions 68e and recesses 68d are the same as that of magnetic poles, imbalancing of the magnetic force can be suppressed.

The resin magnet 68 includes magnetic-pole-position detection portions 68f that are annularly arranged on the outer peripheral portion of the end surface that opposes the magnetic-pole-position detection element (Hall element 58b (see FIG. 4)). The magnetic-pole-position detection portions 68f have a predetermined width and project by a predetermined distance in the axial direction (see FIG. 15). The magnetic-pole-position detection accuracy can be increased by reducing the distance from the magnetic-pole-position detection portions 68f of the resin magnet 68 to the Hall element 58b mounted on the board 58 in the axial direction.

A Hall IC which is surface-mounted on the board 58 and in which the Hall element 58b, which is a magnetic sensor, and an IC for converting an output signal of the Hall element 58b into a digital signal are formed in a single package is used as the magnetic-pole-position detection element. By using the Hall IC, the leakage magnetic flux of the resin magnet 68 is detected at an end surface of the resin magnet 68 in the axial direction (surface opposing the magnetic-pole-position detection element). Accordingly, compared to the case in which the Hall element 58b is fixed to the board 58 with a Hall element holder (not shown) and the main magnetic flux of the resin magnet 68 is detected at a side surface of the resin magnet 68, the processing cost of the board 58, for example, can be reduced and the cost of the pump 10 can be reduced accordingly.

Although not illustrated, as a modification of the resin magnet 68, the gates to which the material of the resin magnet 68 is supplied may be located between the poles. With the resin magnet 68 of this modification, since the gates are positioned between the magnetic poles, variation between the magnetic poles can be reduced and the magnetic-pole-position detection accuracy can be increased. As a result, the quality of the pump 10 can be improved.

Next, the molding process for integrally forming the rotor 60 of an electric motor for a pump by using a thermoplastic resin will be described. The resin magnet 68 will be described as an example.

The mold with which the resin magnet 68 and the sleeve bearing 66 are integrally molded together includes an upper mold part and a lower mold part (not shown). First, the sleeve bearing 66 is set to the lower mold part. Since the sleeve bearing 66 is symmetric about the center thereof in the axially vertical direction, it is not necessary to control the orientation in the circumferential direction when setting the sleeve bearing 66 to the mold. Although the sleeve bearing 66 has the projections 66a (see FIG. 12) on the outer peripheral portion thereof, the positions of the projections 66a are not particularly limited. Therefore, the process can be simplified and the productivity can be increased. As a result, the manufacturing cost can be reduced.

When the sleeve bearing 66 is set to the lower mold part, the inner periphery of the sleeve bearing 66 is held by a sleeve-bearing receiving portion (not shown) provided on the lower mold part, so that the sleeve bearing 66 can be arranged accurately coaxially with the resin magnet 68, which is set in the subsequent step.

After the sleeve bearing 66 has been set to the lower mold part, the resin magnet 68 is set such that the tapered cuts 68b, which are formed at the inner periphery of one end surface of the resin magnet 68 (end surface at the side opposite to the impeller-attachment-portion-67a side in the rotor 60 of the electric motor for the pump), are fitted to positioning projections (not shown) provided on the lower mold part. Although eight cuts 68b are provided in the example illustrated in FIG. 15, four of the eight cuts 68b that are apart from each other by approximately 90 degrees are fitted to the positioning projections (not shown) on the lower mold part so that the sleeve bearing 66 and the resin magnet 68 are arranged accurately coaxially with each other. The reason why eight cuts 68b are provided is to facilitate the process of attaching the resin magnet 68 to the lower mold part.

Then, the magnet pressing portion (not shown) of the upper mold part is pressed against the projections 68a, which have a substantially angular shape, in the axial direction, the projections 68a being formed at the inner periphery of the other end surface of the resin magnet 68 (end surface at the impeller-attachment-portion-67a side in the rotor 60 of the electric motor for the pump). Thus, appropriate positional relationship and coaxiality between the sleeve bearing 66 and the resin magnet 68 are ensured.

In the example illustrated in FIG. 14, three projections 68a in total which have a substantially angular shape (arc shape) are provided at the inner periphery of the resin magnet 68, and mold attachment surfaces (portions pressed by the mold) of the projections 68a are exposed after the integral molding process. The reason why three projections 68a are provided is to not only ensure sufficient positioning accuracy for the resin magnet 68 but also ensure sufficient inflow channel for the thermoplastic resin in the integral molding process, thereby mitigating the molding conditions in the integral molding process and increasing the productivity.

Even when there is a gap between a portion of the lower mold part (not shown) that receives the resin magnet 68 and the outer periphery of the resin magnet 68, appropriate positional relationship and coaxiality between the sleeve bearing 66 and the resin magnet 68 can be ensured by ensuring appropriate coaxiality with the inner-periphery pressing portions (positioning projections) of the lower mold part and clamping the sleeve bearing 66 and the resin magnet 68 between the upper and lower mold parts. As a result, the quality of the pump 10 can be improved.

Conversely, when there is a gap between the portion of the lower mold part (not shown) that receives the resin magnet 68 and the outer periphery of the resin magnet 68, the resin magnet 68 can be easily set to the mold, and the manufacturing cost can be reduced.

After the resin magnet 68 and the sleeve bearing 66 have been set to the mold, a thermoplastic resin, such as polyphenylene ether (PPE), is injected to form the rotor portion 60a. At this time, the cuts 68b in the resin magnet 68 that are not pressed by the mold (FIG. 15), that is, four of the cuts 68b, the projecting portions 68e provided on the magnetic-pole-position-detecting-element-side end surface of the resin magnet 68, the recesses 68d formed in the impeller-attachment-portion-67a-side end surface of the resin magnet 68, and the groove portions 68g provided in the outer peripheral portion of the resin magnet are embedded in the resin portion 67 formed of the thermoplastic resin and serve as rotational-torque transmitting portions. Since the projecting portions 68e, the recesses 68d, and the groove portions 68g are embedded in the resin portion 67 formed of the thermoplastic resin, the resin magnet 68 is securely held.

Since the gates are provided at the pole centers of the resin magnet 68, weld lines, which are V-notch-shaped thin string-like marks formed at locations where flow fronts (end portions of flow) of the resin magnet 68 meet, are formed between the poles. Since the groove portions 68g are formed between the poles of the resin magnet 68, the thermoplastic resin fills the groove portions 68g and securely holds the weld lines of the resin magnet 68, so that cracking of the magnet due to thermal shock can be suppressed.

In the case where the gates are provided at locations between the poles of the resin magnet 68 as in the above-described modification, the weld lines of the resin magnet 68 are formed at the pole centers. Since the groove portions 68g are formed at locations between the poles of the resin magnet 68 (thick portions of the resin magnet 68), the thermoplastic resin fills the groove portions 68g (thin portions of the resin magnet 68) and securely holds the resin magnet 68, so that cracking of the magnet due to thermal shock can be suppressed.

When the resin magnet 68 is magnetized after the resin magnet 68 and the sleeve bearing 66 have been integrally molded together with the thermoplastic resin (resin portion 67), the cuts 67d (four cuts 67d in FIG. 11) formed at the inner periphery of the end surface of the resin magnet 68 at the side opposite to the impeller-attachment-portion-67a side in the rotor portion 60a may be used for positioning. In such a case, the resin magnet 68 can be accurately magnetized.

As described above, Embodiment 1 has the following advantages.

(1) In the resin magnet 68, which is integrally molded together with the sleeve bearing 66 in the rotor portion 60a, they are arranged radially on the end surface that opposes the magnetic-pole-position detection element (Hall element 58b). In addition, the resin magnet 68 includes the projecting portions 68e that are substantially elongated-hole-shaped in cross section, the plurality of recesses 68d that are substantially elliptical in cross section and that are arranged radially in the impeller-attachment-portion-67a-side end surface, and the plurality of groove portions 68g that have a substantially angular shape and that are arranged radially in the outer peripheral portion of the resin magnet. In the integral molding process using the thermoplastic resin (resin portion 67), the projecting portions 68e, the recesses 68d, and the groove portions 68g of the resin magnet 68 are embedded in the thermoplastic resin (resin portion 67), and the resin magnet 68 is held accordingly. Thus, the resin magnet 68 can be securely held without increasing the distance between the stator and the resin magnet in the radial direction.

(2) The projecting portions 68e, which are formed on the resin magnet 68 at the side at which the resin magnet 68 opposes the magnetic-pole-position detection element (Hall element 58b), are located substantially at the centers of the magnetic poles in the rotor 60 and formed in substantially the same shape so as to be arranged substantially radially. Therefore, sufficient magnetic power for magnetic-pole-position detection can be ensured.

(3) The recesses 68d, which are formed in the resin magnet 68 at the impeller-attachment-portion-67a side, are located between the magnetic poles in the rotor 60. The recesses 68d have substantially the same shape, and are arranged substantially radially. Therefore, reduction in magnetic force due to the recesses 68d in the resin magnet 68 can be reduced.

(4) At least one of the number of projecting portions 68e, which are formed on the resin magnet 68 at the side at which the resin magnet 68 opposes the magnetic-pole-position detection element (Hall element 58b), and the number of recesses 68d, which are formed at the impeller-attachment-portion-67a side, is the same as the number of magnetic poles formed in the rotor 60. Accordingly, imbalancing of the magnetic force of the resin magnet 68 can be suppressed.

(5) The resin magnet 68 has gates to which the material of the resin magnet 68 is supplied on the end surface that opposes the magnetic-pole-position detection element (Hall element 58b). When the gates are located at substantially between the magnetic poles, the magnetic-pole-position detection accuracy can be increased.

(6) The resin magnet 68 has gates to which the material of the resin magnet 68 is supplied on the end surface that opposes the magnetic-pole-position detection element (Hall element 58b). When the gates are located at substantially the centers of the magnetic poles, the alignment accuracy of the resin magnet 68 can be increased.

(7) The resin magnet 68 includes the magnetic-pole-position detection portions 68f on an outer peripheral portion of the end surface that opposes the magnetic-pole-position detection element (Hall element 58b). The magnetic-pole-position detection portions 68f have a predetermined width and project by a predetermined distance. Accordingly, the magnetic-pole-position detection accuracy can be increased.

(8) The hollow portion of the resin magnet 68 has a straight shape from the end surface at which the projections 68a are formed to a position around the center in the axial direction, and has a tapered shape from the end surface that opposes the end surface at which the projections 68a are formed to the position around the center in the axial direction. Accordingly, the productivity of the resin magnet 68 can be increased.

Figure 20:
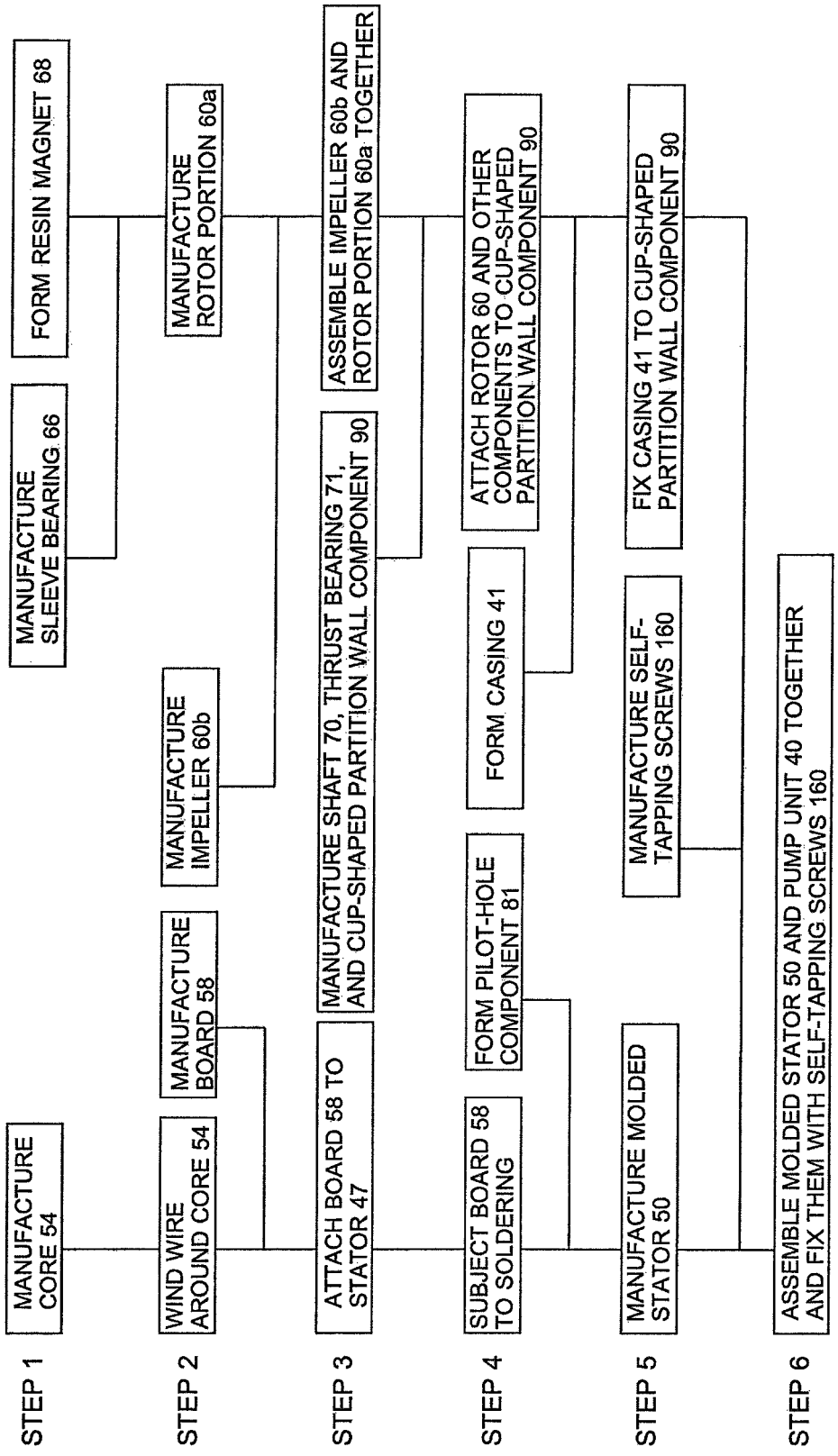
FIG. 20 is a diagram illustrating steps for manufacturing the pump according to Embodiment of the present invention.

FIG. 20 is a diagram illustrating the manufacturing steps of the pump 10. The manufacturing steps of the pump 10 will now be described with reference to FIG. 20. In the following description, "manufacture" may be read as "prepare".

(1) Step 1

First, strip-shaped electromagnetic steel sheets are punched out of an electromagnetic sheet having a thickness of about 0.1 to 0.7 mm, and are stacked together by caulking, welding, bonding, etc., to form the strip-shaped stator core 54. In addition, the sleeve bearing 66 is manufactured. In addition, the resin magnet 68 is formed.

(2) Step 2

Wires are wound around the stator core 54. The insulating portions 56 made of a thermoplastic resin, such as polybutylene terephthalate (PBT), are formed on the teeth of the strip-shaped stator core 54, the teeth being connected to each other with the thin connecting portions. The concentrated winding coils 57 are wound around the teeth on which the insulating portions 56 are formed. For example, twelve concentrated winding coils 57 are connected to form three-phase, single Y-connected windings. Since the three-phase, single Y-connected windings are formed, the terminals 59 (power supply terminals to which power is supplied and a neutral terminal), to which the coils 57 of each phase (U-phase, V-phase, and W-phase) are connected, are provided at the connection side of the insulating portions 56.

In addition, the board 58 is manufactured. The board 58 is clamped between the board pressing member 95 and the insulating portions 56. The IC that drives the electric motor (brushless DC motor), the Hall element that detects the position of the rotor 60, etc., are mounted on the board 58. The lead-wire guide part 61, which guides the lead wire 52 to the outside, is attached to the cut portion of the board 58 at a position near the outer peripheral edge of the board 58.

In addition, the rotor portion 60a is manufactured. The rotor portion 60a includes the ring-shaped (cylindrical) resin magnet 68 molded from pellets formed by kneading powder of a magnetic material, such as ferrite, and resin and the cylindrical sleeve bearing 66 (formed of, for example, carbon) provided inside the resin magnet 68. The resin magnet 68 and the sleeve bearing 66 are integrally molded together with a resin, such as polyphenylene ether (PPE).

In addition, the impeller 60b is formed. The impeller 60b is molded from a thermoplastic resin, such as polyphenylene ether (PPE).

(3) Step 3

The board 58 is attached to the stator 47 in which the wire is around the stator core 54. The board 58 to which the lead-wire guide part 61 is attached is fixed to the insulating portions 56 with the board pressing member 95.

In addition, the impeller 60b is attached to the rotor portion 60a by ultrasonic welding or the like.

In addition, the cup-shaped partition wall component 90 is formed.

In addition, the shaft 70 and the thrust bearing 71 are manufactured. The shaft 70 is formed of SUS. The thrust bearing 71 is formed of ceramic.

(4) Step 4

The board 58 is subjected to soldering. The terminals 59 (power supply terminals to which power is supplied and a neutral terminal) are soldered on the board 58.

In addition, the pilot-hole component 81 is formed.

In addition, the casing 41 is formed. The casing 41 is molded from a thermoplastic resin, such as polyphenylene sulfide (PPS).

In addition, the rotor 60 and other components are attached to the cup-shaped partition wall component 90.

(5) Step 5

The molded stator 50 is manufactured. The stator assembly 49 is completed by attaching the pilot-hole component 81 to the stator 47. The molded stator 50 is manufactured by molding the stator assembly 49.

In addition, the pump unit 40 is assembled by fixing the casing 41 to the cup-shaped partition wall component 90.

In addition, the self-tapping screws 160 are manufactured.

(6) Step 6

The pump 10 is assembled. The pump unit 40 is attached to the molded stator 50, and is fixed to the molded stator 50 with the self-tapping screws 160. More specifically, the pump unit 40 is attached to the molded stator 50, and the self-tapping screws 160 are inserted through the screw holes 44a in the pump unit 40 and fastened to the pilot holes 84 in the molded stator 50, so that the molded stator 50 and the pump unit 40 are fixed together.

Figure 21:
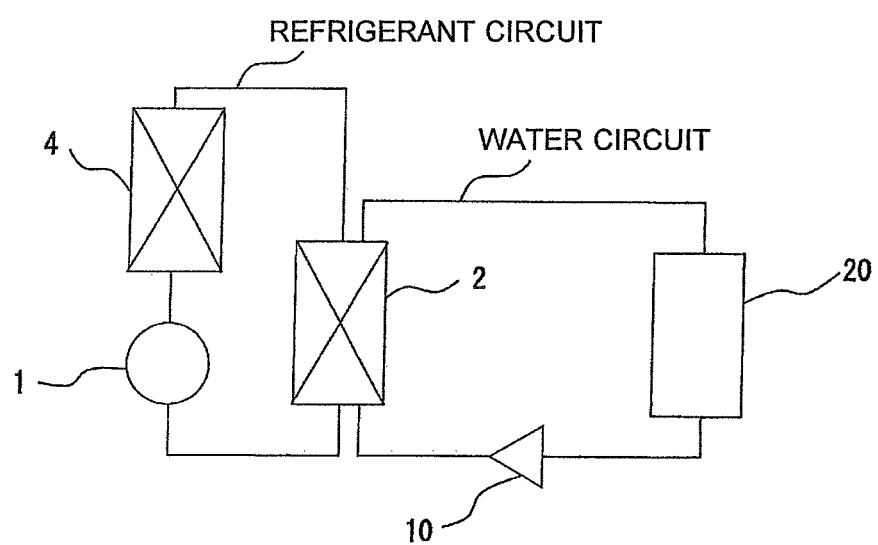
FIG. 21 is a conceptual diagram illustrating a circuit configuration of a refrigeration cycle apparatus according to Embodiment of the present invention which includes a refrigerant-water heat exchanger.

FIG. 21 is a conceptual diagram illustrating a refrigeration cycle apparatus including the refrigerant-water heat exchanger 2. The heat-pump-type hot-water supplying apparatus 300 illustrated in FIG. 1 is an example of a refrigeration cycle apparatus including the refrigerant-water heat exchanger 2.

The apparatus including the refrigerant-water heat exchanger 2 is, for example, an air-conditioning apparatus, a floor heating apparatus, or a hot-water supplying apparatus. The pump 10 according to Embodiment is mounted in a water circuit of the apparatus including the refrigerant-water heat exchanger 2, and circulates water cooled by the refrigerant-water heat exchanger 2 or water heated by the refrigerant-water heat exchanger 2 (hot water) in the water circuit.

As illustrated in FIG. 21, the refrigeration cycle apparatus including the refrigerant-water heat exchanger 2 includes a refrigerant circuit including the compressor 1 (for example, a scroll compressor, a rotary compressor, etc.) that compresses refrigerant, the refrigerant-water heat exchanger 2 that exchanges heat between the refrigerant and water, and the evaporator 4 (heat exchanger). The apparatus also includes a water circuit including the pump 10, the refrigerant-water heat exchanger 2, and a load 20. Thus, the refrigerant circuit and the water circuit are connected to each other with the refrigerant-water heat exchanger 2 so as to transfer heat therebetween.

In the case where the pump 10 including the rotor 60 of an electric motor for a pump is applied to the refrigeration cycle apparatus including the refrigerant-water heat exchanger 2, since the performance and quality of the pump 10 are improved and the productivity of the pump 10 is increased, the performance and quality of the refrigeration cycle apparatus including the refrigerant-water heat exchanger 2 can be improved and the cost of the apparatus can be reduced.

REFERENCE SIGNS LIST 1 compressor 2 refrigerant-water heat exchanger 3 decompression device 4 evaporator 5 pressure detection device 6 fan motor 7 fan 8 heating-temperature detection means 9 water-supply-temperature detection means 10 pump 11 operation unit 12 tank-unit controller 13 heat-pump-unit controller 14 hot-water tank 15 refrigerant pipe 16 hot-water circulating pipe 17 outside-air-temperature detection means 20 load 31 bath-water-reheating heat exchanger 32 bath-water circulating device 33 mixing valve 34 tank-water-temperature detection device 35 reheated-water-temperature detection device 36 mixed-water-temperature detection device 37 bath-water reheating pipe 40 pump unit 41 casing 42 inlet 43 outlet 44 boss portion 44a screw hole 46 shaft support portion 47 stator 49 stator assembly 50 molded stator 52 lead wire 53 molding resin 54 stator core 54a groove 56 insulating portion 57 coil 58 board 58b Hall element 59 terminal 60 rotor 60a rotor portion 60b impeller 61 lead-wire guide part 63 pump-unit receiving surface 66 sleeve bearing 66a projection 67 resin portion 67a impeller attachment portion 67b recess 67c hole 67d cut 67e gate 68 resin magnet 68a projection (corresponding to first projection in the present invention) 68a-1 protruding portion 68b cut 68d recess 68e projecting portion (corresponding to second projection in the present invention) 68f magnetic-pole-position detection portion 68g groove portion 70 shaft 71 thrust bearing 80 O-ring 81 pilot-hole component 82 mold pressing portion 83 projection 84 pilot hole 85 leg portion 85a projection 86 lug 87 connecting portion 90 cup-shaped partition wall component 90a cup-shaped partition wall portion 90b flange portion 90c ring receiving groove 90d hole 92 rib 94 shaft support portion 95 board pressing member 95a projection 100 heat pump unit 160 self-tapping screw 200 tank unit 300 heat-pump-type hot-water supplying apparatus

The invention claimed is:

1. A pump comprising:
a molded stator including a board on which a magnetic-pole-position detection element is mounted; and
a rotor including a rotor portion that is rotatably accommodated in a cup-shaped partition wall component, the rotor portion opposing the magnetic-pole-position detection element at one end and having an impeller attachment portion for attaching an impeller at other end,
wherein, in the rotor portion, a magnet and a sleeve bearing disposed inside the magnet are integrally assembled together by using a thermoplastic resin, and the impeller attachment portion is formed of the thermoplastic resin,
wherein the magnet has a plurality of groove portions in an outer peripheral portion thereof, the groove portions extending in an axial direction, each of the groove portions has a substantially angular shape that is opened in the outer peripheral portion, the groove portions being arranged substantially radially,
wherein the magnet includes a same number of magnetic-pole-position detection portions as a number of magnetic poles, the magnetic-pole-position detection portions being formed at centers of the magnetic poles on an outer peripheral portion of a magnetic-pole-position-detecting-element-opposing-side end surface of the rotor portion, wherein the opened substantially angular shape of each of the groove portions is centered between adjacent ones of the magnetic poles formed in the rotor, wherein the magnetic-pole-position detection portions protrude from a bottom surface of the magnet, between the groove portions, opposing the magnetic-pole-position detection element of the molded stator in the axial direction, and wherein a first circumferential wall and a second circumferential wall of at least one of the groove portions are formed on respective adjacent ones of the magnetic poles.

2. The pump of claim 1,
wherein the groove portions have substantially a same shape.

3. The pump of claim 1,
wherein the groove portions are formed so as to open in both end surfaces of the rotor.

4. The pump of claim 1,
wherein the magnet includes
a hollow portion,
a plurality of second projections arranged radially on the magnetic-pole-position-detecting-element-opposing-side end surface of the rotor portion, the second projections adapted to be pressed against in molding, and
a plurality of first projections provided on the hollow portion with substantially constant intervals therebetween in a circumferential direction, the first projections extending in the axial direction toward an impeller-side end surface and adapted to be pressed against in molding.

5. The pump of claim 1,
wherein the magnet has a plurality of cuts arranged radially in the magnetic-pole-position-detecting-element-opposing-side end surface of the rotor portion, the cuts allowing the magnet to be positioned in a rotational direction and arranged coaxially with the sleeve bearing.

6. The pump of claim 1,
wherein the magnet is formed of a resin magnet, and
wherein the magnet includes a gate that is formed on the magnetic-pole-position-detecting-element-opposing-side end surface of the rotor portion and to which a material of the resin magnet is supplied, the gate being positioned at a center of a magnetic pole formed in the rotor.

7. The pump of claim 1,
wherein the magnet is formed of a resin magnet, and
wherein the magnet includes a gate that is formed on the magnetic-pole-position-detecting-element-opposing-side end surface of the rotor portion and to which a material of the resin magnet is supplied, the gate being positioned between magnetic poles formed in the rotor.

8. A refrigeration cycle apparatus in which a refrigerant circuit and a water circuit are connected to each other with a refrigerant-water heat exchanger, wherein the pump of claim 1 is mounted in the water circuit.

9. The pump of claim 1,
wherein the groove portions formed in the magnet are embedded in the thermoplastic resin when the magnet and the sleeve bearing are integrally molded together with the thermoplastic resin.

10. The pump of claim 4,
wherein the hollow portion has a straight shape from a first end surface at which the first projections are formed, the first end surface being the impeller-side end surface of the rotor portion, and has a tapered shape in an axial direction from a second end surface opposite to the first end surface to a position around a center in the axial direction.

11. The pump of claim 1,
wherein the magnet includes
a plurality of projecting portions that are substantially elliptical in cross section, the projecting portions are arranged radially on the magnetic-pole-position-detecting-element-opposing-side end surface of the rotor portion, the projecting portions are disposed substantially at the centers of the magnetic poles.

12. The pump of claim 1,
wherein the magnet includes
a plurality of recesses that are substantially elongated-hole-shaped, the recesses are arranged radially in an impeller-attachment-portion-side end surface of the rotor portion opposite to the magnetic-pole-position-detecting-element-opposing-side end surface, the recesses are provided between the poles.

13. The pump of claim 1,
wherein centers of the magnetic-pole-position detection portions are centered at centers of the magnetic poles.

* * * * *